(12) United States Patent
Nagasawa

(10) Patent No.: US 10,055,178 B2
(45) Date of Patent: Aug. 21, 2018

(54) IMAGE FORMING SYSTEM AND PROGRAM BETWEEN A PORTABLE TERMINAL AND AN IMAGE FORMING DEVICE

(71) Applicant: Konica Minolta, Inc., Chiyoda-ku, Tokyo (JP)

(72) Inventor: Kenichi Nagasawa, Takatsuki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/284,609

(22) Filed: Oct. 4, 2016

(65) Prior Publication Data

US 2017/0102903 A1     Apr. 13, 2017

(30) Foreign Application Priority Data

Oct. 8, 2015 (JP) ................. 2015-200009

(51) Int. Cl.
*G06K 15/00* (2006.01)
*G06F 3/12* (2006.01)
*H04N 1/00* (2006.01)

(52) U.S. Cl.
CPC .......... *G06F 3/1222* (2013.01); *G06F 3/1236* (2013.01); *G06F 3/1238* (2013.01); *G06F 3/1292* (2013.01); *H04N 1/00103* (2013.01); *H04N 2201/0094* (2013.01)

(58) Field of Classification Search
None
See application file for complete search history.

(56) References Cited

U.S. PATENT DOCUMENTS

2016/0277877 A1* 9/2016 Tsunoda .............. H04W 76/023

2017/0085694 A1* 3/2017 Shibao ................ H04M 1/7253

FOREIGN PATENT DOCUMENTS

| JP | 2014/127130 A | 7/2014 |
| JP | 2014-197360 A | 10/2014 |
| JP | 2015/022647 A | 2/2015 |

OTHER PUBLICATIONS

Notice of Reasons for Rejection dated Oct. 24, 2017, by the Japanese Patent Office in corresponding Japanese Application No. 2015-200009. (8 pages).

* cited by examiner

*Primary Examiner* — Henok A Shiferaw
(74) *Attorney, Agent, or Firm* — Buchanan Ingersoll & Rooney PC

(57) ABSTRACT

A non-transitory recording medium storing a computer readable program causes a computer included in a portable terminal to communicate with an image forming device to execute: a) a step of acquiring communication information from the image forming device via first wireless communication, the communication information being information for executing second wireless communication; b) a step of executing processing of confirming existence of a user who possesses the portable terminal in the vicinity of the image forming device; and c) a step of, on condition that existence of the user in the vicinity of the image forming device is confirmed in the step b), permitting registration processing of registering the communication information in the portable terminal in order to execute the second wireless communication, the communication information being communication information for the second wireless communication with the image forming device and being acquired in the step a).

21 Claims, 24 Drawing Sheets

IMAGE FORMING SYSTEM AND PROGRAM BETWEEN A PORTABLE TERMINAL AND AN IMAGE FORMING DEVICE

The entire disclosure of Japanese Patent Application No. 2015-200009 filed on Oct. 8, 2015 including description, claims, drawings, and abstract are incorporated herein by reference in its entirety.

BACKGROUND OF THE INVENTION

Field of the Invention

The present invention relates to an image forming system including an image forming device (e.g., MFP (Multi-Functional Peripheral)) and a portable terminal and a technique related thereto.

Description of the Related Art

There is a technique for performing wireless communication between an MFP and a portable terminal (see, for example, JP 2014-127130 A).

For example, JP 2014-127130 A (see, for example, paragraph 0038 thereof) discloses a technique for exchanging data between an MFP and a portable terminal with the use of near field communication (NFC) and communication using a wireless LAN. In the technique disclosed in JP 2014-127130 A, first, NFC communication is established between the MFP and the portable terminal, and connection information for wireless LAN communication (SSID (Service Set Identifier) and the like) is transmitted from the MFP to the portable terminal by using the NFC communication. Then, wireless LAN communication is established between the MET and the portable terminal by using the connection information, and, for example, printing data is transmitted from the portable terminal to the MFP via comparatively high-speed wireless LAN communication.

By the way, various wireless communication techniques can be used for communication between an image forming device and a portable terminal. For example, it is considered that short-range wireless communication such as Bluetooth communication (communication based on a Bluetooth (registered trademark) standard (including BLE (Bluetooth Low Energy))) is employed instead of NFC (near field communication).

However, a communication range in NFC communication is about several centimeters, whereas a communication range in Bluetooth communication (e.g., BLE (Bluetooth Low Energy (Bluetooth LE)) communication) is comparatively large and reaches, for example, about 30 meters in some cases. In the case where BLE communication is performed between a portable terminal and an MFP, the portable terminal and the MFP may actually be some distance away from each other, and therefore there is a concern about a harmful effect thereof.

For example, it is concerned that, in the case where an MFP is placed in a certain building, the MFP can be accessed from a building next to the certain building by using a portable terminal. In short, unauthorized access may be performed from the next building by using a portable terminal.

SUMMARY OF THE INVENTION

In view of this, a first object of the present application is to provide a technique capable of preventing unauthorized access to an image forming device from a comparatively distant place with the use of a portable terminal.

There is not only the above-mentioned concern (i.e., concern about unauthorized access from the next building) but also the following concern.

For example, in the case where wireless LAN communication and short-range wireless communication are not used together, i.e., in the case where only short-range wireless communication is used without using wireless LAN communication (more specifically, in the case of logging in an image forming device from a portable terminal by using short-range wireless communication), the following problem may arise.

Specifically, assuming that, although a portable terminal actually exists at a position comparatively distant from an image forming device, login information is unconditionally transmitted from the portable terminal to the image forming device via BLE communication, a user of the portable terminal is allowed to perform login even in the case where the user exists at a place comparatively distant from the image forming device. In this case, the image forming device may misrecognize operation (panel operation) of the image forming device by a user (another user who exists in the vicinity of the image forming device) who is different from the user (also referred to as "login user") as operation by the login user and execute processing based on the operation. In short, panel operation by another user may be misrecognized as panel operation by the login user.

In view of this, a second object of the present application is to provide a technique capable of preventing login to an image forming device using a portable terminal that exists in a comparatively distant place and preventing operation by a user who is different from a login user from being misrecognized as operation by the login user.

To achieve at least one of the abovementioned objects, according to an aspect, a non-transitory recording medium storing a computer readable program reflecting one aspect of the present invention causes a computer included in a portable terminal to communicate with an image forming device to execute: a) a step of acquiring communication information from the image forming device via first wireless communication using a first wireless communication method, the communication information being information for executing second wireless communication using a second wireless communication method; b) a step of executing processing of confirming existence of a user who possesses the portable terminal in the vicinity of the image forming device; and c) a step of, on condition that existence of the user in the vicinity of the image forming device is confirmed in the step b), permitting registration processing of registering the communication information in the portable terminal in order to execute the second wireless communication, the communication information being communication information for the second wireless communication with the image forming device and being acquired in the step a).

According to an invention of Item. 2, in the non-transitory recording medium storing a computer readable program according to Item. 1, the step b) preferably includes b-1) a step of capturing an image of a two-dimensional barcode displayed in the image forming device by using an image pickup unit of the portable terminal, and b-2) a step of determining existence of the user in the vicinity of the image forming device on condition that information acquired by analyzing the two-dimensional barcode included in the photographed image captured in the step b-1) and information contained in the communication information acquired in the step a) are matched.

According to an invention of Item. 3, in the non-transitory recording medium storing a computer readable program according to Item. 1, the step b) preferably includes b-1) a step of capturing an image of a two-dimensional barcode displayed in the image forming device by using an image pickup unit of the portable terminal, b-2) a step of acquiring information containing device identification information of the image forming device from the image forming device via the first wireless communication, and b-3) a step of determining existence of the user in the vicinity of the image forming device on condition that information acquired by analyzing the two-dimensional barcode included in the photographed image captured in the step b-1) and information acquired in the step b-2) are matched.

According to an invention of Item. 4, in the non-transitory recording medium storing a computer readable program according to Item. 1, the step b) preferably includes b-1) a step of reading information of an NFC tag placed in the image forming device by using the portable terminal to acquire the information, and b-2) a step of determining existence of the user in the vicinity of the image forming device on condition that the information acquired in the step b-1) and information contained in the communication information acquired in the step a) are matched.

According to an invention of Item. 5, in the non-transitory recording medium storing a computer readable program according to Item. 1, the step b) preferably includes b-1) a step of reading information of an NFC tag placed in the image forming device by using the portable terminal to acquire the information, b-2) a step of acquiring information containing device identification information of the image forming device from the image forming device in the first wireless communication, and b-3) a step of determining existence of the user in the vicinity of the image forming device on condition that the information acquired in the step b-1) and information acquired in the step b-2) are matched.

According to an invention of Item. 6, in the non-transitory recording medium storing a computer readable program according to any one of Items. 2 to 5, the communication information preferably contains device identification information, and in the step b-2), existence of the user in the vicinity of the image forming device is preferably determined on condition that device identification information acquired in the step b-1) and the device identification information acquired in the step a) are matched.

According to an invention of Item. 7, in the non-transitory recording medium storing a computer readable program according to Item. 6, the device identification information preferably includes a MAC address.

According to an invention of Item. 8, in the non-transitory recording medium storing a computer readable program according to Item. 7, the communication information preferably includes an SSID for the second wireless communication and a password for the second wireless communication, and in the step b-2), existence of the user in the vicinity of the image forming device is preferably determined on condition that an SSID, a password, and a MAC address acquired in the step b-1) are matched with the SSID, the password, and the MAC address, respectively, acquired in the step a).

According to an invention of Item. 9, in the non-transitory recording medium storing a computer readable program according to Item. 1, the step b) preferably includes b-1) a step of receiving card identification information from the image forming device via the first wireless communication, the card identification information being card identification information of an IC card of the user and being read by an IC card reader of the image forming device, and b-2) a step of determining existence of the user in the vicinity of the image forming device on condition that the card identification information acquired in the step b-1) and card identification information of a usable IC card registered in the portable terminal in advance are matched.

According to an invention of Item. 10, in the non-transitory recording medium storing a computer readable program according to any one of Items. 1 to 9, the computer readable program preferably causes the computer to further execute d) a step of trying the second wireless communication with a communication destination specified by an IP address acquired in the step a) and, based on success or failure of the second wireless communication, determining whether or not the registration processing of the communication information for executing the second wireless communication has been completed, and the step c) is preferably executed on condition that it is determined in the step d) that the registration processing of the communication information for executing the second wireless communication has not yet been completed.

According to an invention of Item. 11, in the non-transitory recording medium storing a computer readable program according to anyone of Items. 1 to 10, the first wireless communication is preferably executed without pairing processing between the image forming device and the portable terminal.

To achieve at least one of the abovementioned objects, according to an aspect, a portable terminal to communicate with an image forming device reflecting one aspect of the present invention comprises: a first wireless communication unit configured to execute first wireless communication using a first wireless communication method; a second wireless communication unit configured to execute second wireless communication using a second wireless communication method; a communication control unit configured to acquire information containing communication information for executing the second wireless communication from the image forming device via the first wireless communication; a confirmation unit configured to execute confirmation processing of confirming existence of a user who possesses the portable terminal in the vicinity of the image forming device; and a registration control unit configured to permit registration processing of registering the communication information for the second wireless communication with the image forming device in the portable terminal in order to execute the second wireless communication on condition that the confirmation unit confirms existence of the user in the vicinity of the image forming device.

According to an invention of Item. 13, in the portable terminal according to Item. 12, the confirmation unit preferably includes an image pickup unit configured to capture an image of a two-dimensional barcode displayed in the image forming device, and a determination unit configured to determine existence of the user in the vicinity of the image forming device on condition that information acquired by analyzing the two-dimensional barcode included in the photographed image captured by the image pickup unit and the information acquired from the image forming device via the first wireless communication are matched.

According to an invention of Item. 14, in the portable terminal according to Item. 13, the communication control unit preferably acquires information containing device identification information of the image forming device from the image forming device via the first wireless communication, and the determination unit preferably determines existence of the user in the vicinity of the image forming device on condition that device identification information acquired by analyzing the two-dimensional barcode in the photographed image and the device identification information acquired from the image forming device via the first wireless communication are matched.

According to an invention of Item. 15, in the portable terminal according to Item. 14, the communication information preferably includes an SSID for the second wireless communication and a password for the second wireless communication, and the determination unit preferably determines existence of the user in the vicinity of the image forming device on condition that an SSID, a password, and a MAC address acquired by analyzing the two-dimensional barcode in the photographed image are matched with the SSID, the password, and a MAC address, respectively, acquired from the image forming device via the first wireless communication.

According to an invention of Item. 16, in the portable terminal according to Item. 12, the confirmation unit preferably includes a reading unit configured to read information of an NFC tag placed in the image forming device to acquire the information, and a determination unit configured to determine existence of the user in the vicinity of the image forming device on condition that the information acquired by the reading unit and the information acquired from the image forming device via the first wireless communication are matched.

According to an invention of Item. 17, in the portable terminal according to Item. 16, the communication control unit preferably acquires information containing device identification information of the image forming device from the image forming device via the first wireless communication, and the determination unit preferably determines existence of the user in the vicinity of the image forming device on condition that device identification information acquired by the reading unit and the device identification information acquired from the image forming device via the first wireless communication are matched.

According to an invention of Item. 18, in the portable terminal according to Item. 17, the communication information preferably includes an SSID for the second wireless communication and a password for the second wireless communication, and the determination unit preferably determines existence of the user in the vicinity of the image forming device on condition that an SSID, a password, and a MAC address acquired by the reading unit are matched with the SSID, the password, and a MAC address, respectively, acquired from the image forming device via the first wireless communication.

According to an invention of Item. 19, in the portable terminal according to Item. 12, the first wireless communication unit preferably receives card identification information from the image forming device, the card identification information being card identification information of an IC card of the user and being read by an IC card reader of the image forming device, and the confirmation unit preferably includes a determination unit configured to determine existence of the user in the vicinity of the image forming device on condition that the card identification information acquired by the first wireless communication unit via the first wireless communication and card identification information of a usable IC card registered in the portable terminal in advance are matched.

According to an invention of Item. 20, in the portable terminal according to any one of Items. 12 to 19, the communication control unit preferably tries the second wireless communication with a communication destination specified by an IP address acquired via the first wireless communication, and the registration control unit preferably determines whether or not the registration processing of the communication information for executing the second wireless communication has been completed on the basis of a result of trial of the second wireless communication, causes the confirmation unit to execute the confirmation processing on condition that it is determined that the registration processing has not yet been completed, and determines whether to permit the registration processing of registering the communication information in the portable terminal in order to execute the second wireless communication.

According to an invention of Item. 21, in the portable terminal according to any one of Items. 12 to 20, the first wireless communication is preferably executed without pairing processing between the image forming device and the portable terminal.

To achieve at least one of the abovementioned objects, according to an aspect, a non-transitory recording medium storing a computer readable program reflecting one aspect of the present invention causes a computer included in a portable terminal communicable with an image forming device by using short-range wireless communication to log in the image forming device to execute: a) a step of registering card identification information of an IC card of a user who possesses the portable terminal in the portable terminal in advance; b) a step of, in the case where operation to log in the image forming device is performed by the user after the step a), receiving card identification information of an IC card read by an IC card reader of the image forming device from the image forming device via the short-range wireless communication; c) a step of determining existence of the user in the vicinity of the image forming device on condition that the card identification information acquired in the step b) and the card identification information registered in the portable terminal in advance in the step a) are matched; and d) a step of transmitting the user's login information to the image forming device to the image forming device via the short-range wireless communication on condition that existence of the user in the vicinity of the image forming device is determined in the step c).

According to an invention of Item. 23, in the non-transitory recording medium storing a computer readable program according to Item. 22, in the step b), in the case where the image forming device determines that the card identification information read by the IC card reader has not yet been registered in the image forming device, the card identification information is preferably transmitted from the image forming device to the portable terminal via the short-range wireless communication.

To achieve at least one of the abovementioned objects, according to an aspect, a portable terminal communicable with an image forming device by using short-range wireless communication to log in the image forming device, reflecting one aspect of the present invention comprises: a registration control unit configured to accept processing of registering card identification information of an IC card of a user who possesses the portable terminal in the portable terminal in advance; a reception unit configured to, in the case where operation to log in the image forming device is performed by the user, receive card identification information of an IC card read by an IC card reader of the image forming device from the image forming device via the short-range wireless communication; a confirmation unit configured to confirm existence of the user in the vicinity of the image forming device on condition that the card identification information received by the reception unit and the card identification information registered in the portable terminal in advance by using the registration control unit are matched; and a transmission unit configured to transmit the user's login information to the image forming device to the image forming device via the short-range wireless communication on condition that existence of the user in the vicinity of the image forming device is confirmed.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

1. First Embodiment 1-1. Overview of Configuration

Figure 1:
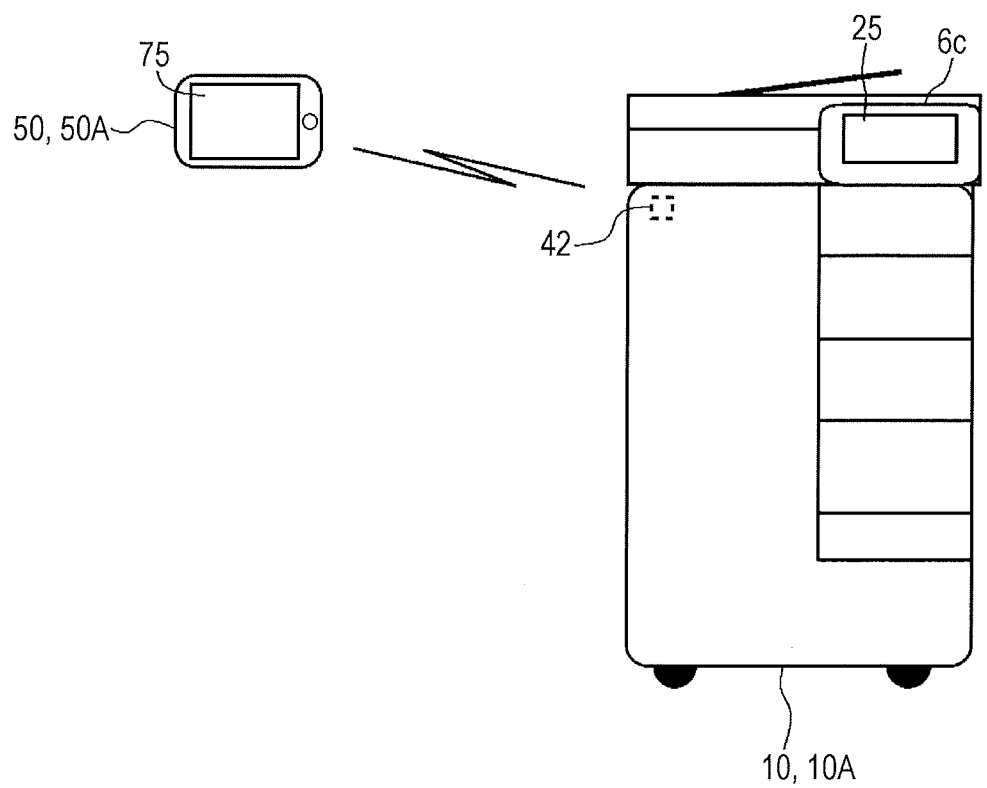
FIG. 1 shows an image forming system according to a first embodiment.

FIG. 1 shows an image forming system 1 (also referred to as "1A") according to a first embodiment. As shown in FIG. 1, the image forming system 1 (1A) includes an MFP (image forming device) 10 (10A) and a portable terminal 50 (50A).

The MFP 10 and the portable terminal 50 are wirelessly connected to each other by using various wireless communication techniques. For example, short-range wireless communication and communication using a wireless LAN (e.g., IEEE 802.11) can be used for communication between the MFP 10 and the portable terminal. In this embodiment, as the short-range wireless communication, communication using a Bluetooth (registered trademark) method (Bluetooth communication) is used. More specifically, as the Bluetooth communication, communication using a BLE (Bluetooth Low Energy) method (also referred to as "BLE communication") is employed. Note that the image forming system 1 is also referred to as "communication system".

First, the portable terminal 50 (specifically, an application 120 (see FIG. 3) installed on the portable terminal 50) executes BLE communication with the MFP 10. In this BLE communication, communication information (IP address, SSID (Service Set Identifier), password, and the like) for performing wireless LAN communication (e.g., WiFi communication) is acquired. Thereafter, the portable terminal 50 can perform wireless LAN communication by using this communication information. Note that the communication information is also referred to as connection information for establishing wireless LAN communication connection.

However, assuming that, immediately after the communication information for a wireless LAN is received via BLE communication, the communication information is immediately registered in the portable terminal 50, the following problem arises.

Specifically, a communication range of Bluetooth communication (e.g., BLE communication) reaches, for example, about 30 meters in some cases as described above, and therefore, even in the case where both the portable terminal 50 and the MFP 10 are some distance away from each other, BLE communication can be performed between the both devices in some cases. In this case, for example, it is concerned that the MFP can be accessed by using the portable terminal from a building next to a building in which the MFP is placed. In short, it is concerned that unauthorized access from the next building is performed by using the portable terminal 50.

In view of this, in the first embodiment, as described below, existence of a user of the portable terminal 50 in the vicinity of the MFP 10 is confirmed by, for example, capturing an image of a two-dimensional barcode displayed on a touchscreen 25 of the MFP 10 with the use of an image pickup unit 57 of the portable terminal 50. On condition that existence of the user in the vicinity of the MFP 10 is confirmed, registration processing of registering the communication information, which is communication information for wireless LAN communication with the MFP 10 and is acquired via BLE communication, in the portable terminal 50 is permitted.

According to this, it is possible to prevent unauthorized access to an image forming device from a comparatively distant place with the use of a portable terminal. Such an embodiment will be described in more detail below.

1-2. Configuration of Image Forming Device

Figure 2:
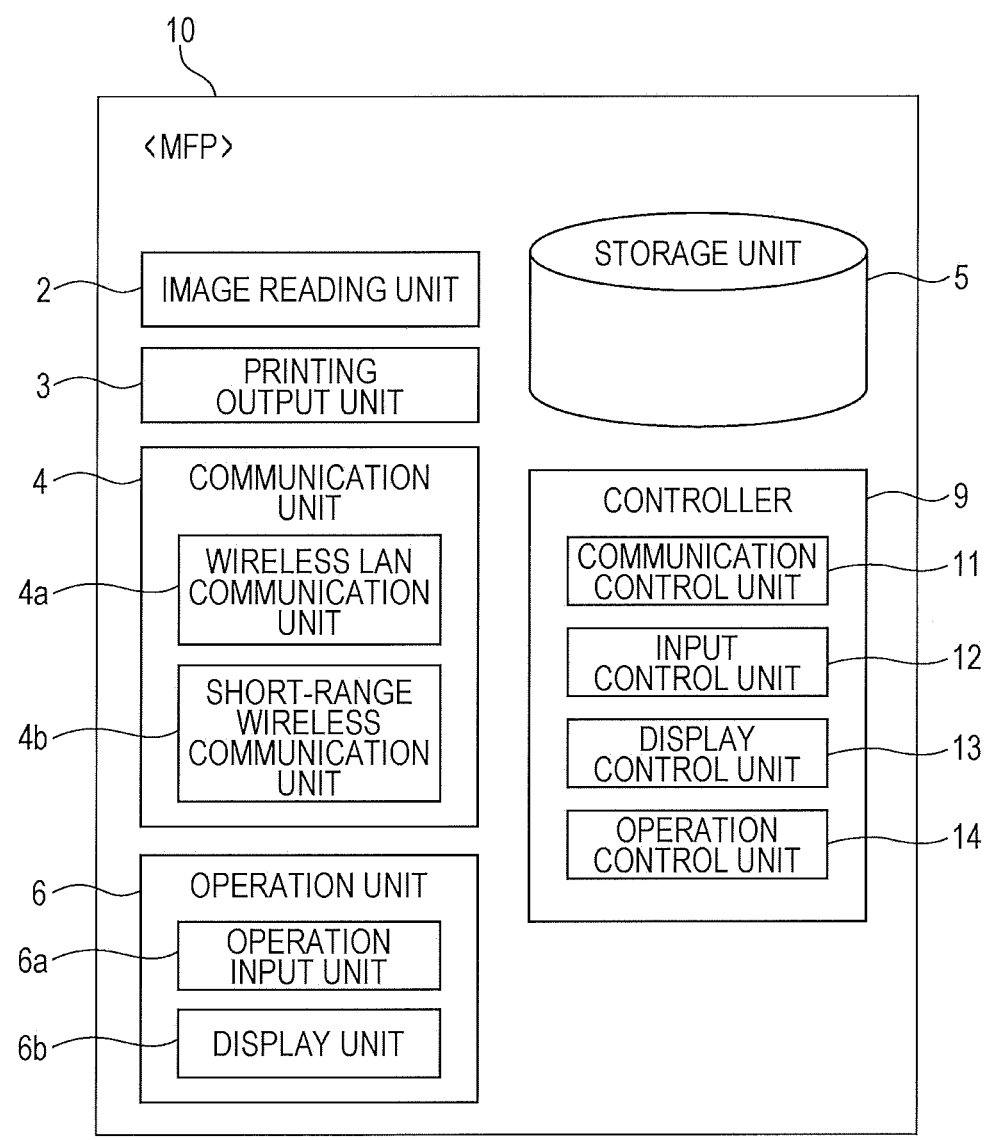
FIG. 2 is a functional block diagram showing a schematic configuration of an MFP (image forming device)

FIG. 2 shows a functional block of the image forming device 10. Herein, an MFP (multi-functional peripheral) is exemplified as the image forming device 10. In FIG. 2, a functional block of the MFP 10 is shown. Note that the MFP 10 is also expressed as "image processing device" or the like.

The MFP 10 is a device (also referred to as "multifunction device") having a scanning function, a copy function, a facsimile function, a box storage function, and the like. Specifically, as shown in the functional block diagram of FIG. 2, the MFP 10 includes an image reading unit 2, a printing output unit 3, a communication unit 4, a storage unit 5, an operation unit 6, a controller 9, and the like and realizes various functions by complexly operating those units.

The image reading unit 2 is a processing unit for optically reading (i.e., scanning) a manuscript placed on a predetermined position of the MFP 10 and generating image data of the manuscript (also referred to as "manuscript image" or "scanned image") (forming an image thereof). The image reading unit 2 is also referred to as "scanning unit".

The printing output unit 3 is an output unit for printing and outputting an image (forming an image) on various media such as paper on the basis of data regarding a target to be printed.

The communication unit 4 is a processing unit capable of performing facsimile communication via a public network or the like. The communication unit 4 can also perform various kinds of wireless communication (including wireless communication using a Bluetooth method and the like). Specifically, the communication unit 4 includes a wireless LAN communication unit 4a for performing wireless communication using a wireless LAN (e.g., IEEE 802.11) and a short-range wireless communication unit 4b for performing wireless communication using a Bluetooth method. The MFP 10 includes a communication chip 42 (also referred to as "short-range wireless communication chip") functioning as a part or all of the short-range wireless communication unit 4b (see also FIG. 1). The communication chip 42 can broadcast-transmit advertising data. The advertising data contains an identifier for identifying the MFP 10 (device identification information) (e.g., a MAC address (Media Access Control address) of the MFP 10). The device identification information is also expressed as information for uniquely specifying (identifying) a device.

The storage unit 5 includes a storage device such as a hard disk drive (HDD).

The operation unit 6 includes an operation input unit 6a for accepting operation input to the MFP 10 and a display unit 6b for displaying and outputting various kinds of information.

In the MFP 10, a substantially plate-like operation panel unit 6c (see FIG. 1) is provided. The operation panel unit 6c includes the touchscreen 25 (see FIG. 1) on the front side thereof. The touchscreen 25 also functions as a part of the operation input unit 6a and also functions as a part of the display unit 6b. The touchscreen 25 is configured by embedding various sensors and the like in a liquid crystal display panel and can display various kinds of information and accept various kinds of operation input from an operator.

The controller 9 is a control device that is included in the MFP 10 and comprehensively controls the MFP 10. The controller 9 is configured as a computer system including a CPU, various semiconductor memories (RAM and ROM), and the like. The controller 9 realizes various processing units by executing, in the CPU, a predetermined software program (hereinafter, also simply referred to as "program") stored in the ROM (e.g., EEPROM (registered trademark)). Note that the program (specifically, program module group) may be recorded on a portable recording medium such as a USB memory and be read out from the recording medium to be installed on the MFP 10. Alternatively, the program may be downloaded via a network or the like to be installed on the MFP 10.

Specifically, as shown in FIG. 2, the controller 9 executes the above program to realize various processing units including a communication control unit 11, an input control unit 12, a display control unit 13, and an operation control unit 14.

The communication control unit 11 is a processing unit that cooperates with the communication unit 4 and the like to control communication operation with another device (e.g., portable terminal 50). The communication control unit 11 includes a transmission control unit for controlling transmission operation of various kinds of data and a reception control unit for controlling reception operation of various kinds of data.

The input control unit 12 is a control unit for controlling operation of operation input to the operation input unit 6a (touchscreen 25 and the like). For example, the input control unit 12 controls operation of accepting operation input (e.g., specification input from a user) to an operation screen displayed on the touchscreen 25.

The display control unit 13 is a processing unit for controlling display operation in the display unit 6b (touchscreen 25 and the like). The display control unit 13 displays, for example, an operation screen (remote operation screen) 200 for operating the MFP 10 on the touchscreen 25.

The operation control unit 14 is a processing unit for controlling various operations (printing output operation, scanning operation, and the like).

1-3. Configuration of Portable Terminal

A configuration of the portable terminal 50 will be described.

The portable terminal 50 is a device capable of cooperatively operating with the MFP 10 (image forming device).

Specifically, the portable terminal 50 is an information input/output terminal device (information terminal) capable of performing communication (short-range wireless communication, wireless LAN communication, and the like) with the MFP 10. Herein, a tablet terminal is exemplified as the portable terminal 50. However, the portable terminal 50 is not limited thereto and may be a smartphone or the like.

Figure 3:
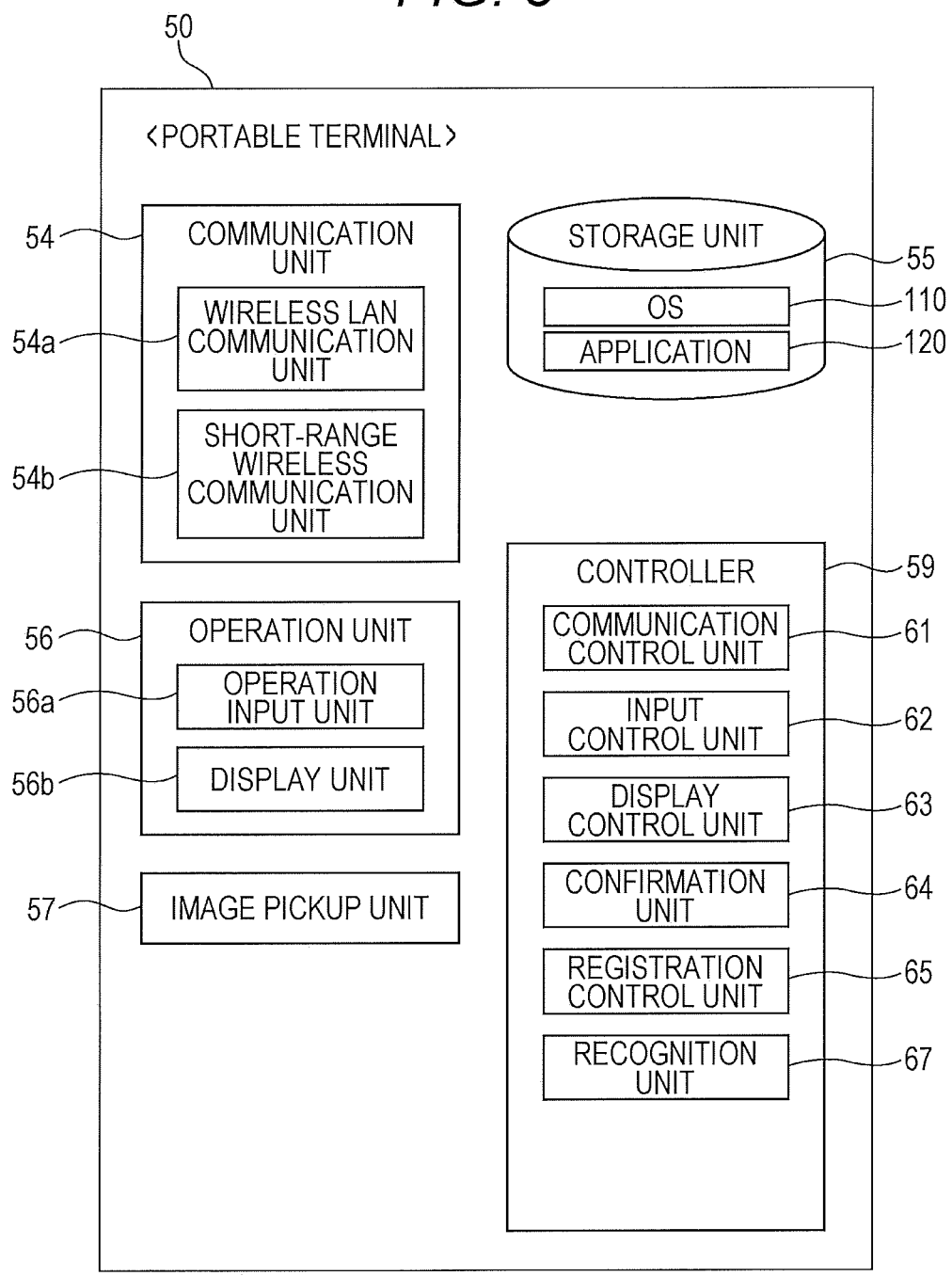
FIG. 3 is a functional block diagram showing a schematic configuration of a portable terminal.

FIG. 3 is a functional block diagram showing a schematic configuration of the portable terminal 50.

As shown in the functional block diagram of FIG. 3, the portable terminal 50 includes a communication unit 54, a storage unit 55, an operation unit 56, the image pickup unit 57, a controller 59, and the like and realizes various functions by complexly operating those units.

The communication unit 54 can perform various kinds of wireless communication (including wireless communication based on a Bluetooth standard and the like). Specifically, the communication unit 54 includes a wireless LAN communication unit 54a for performing wireless communication using a wireless LAN (e.g., IEEE 802.11) and a short-range wireless communication unit 54b for performing wireless communication using Bluetooth (more specifically, BLE communication or the like). Each of the communication units 54a and 54b includes a transmission unit and a reception unit.

The short-range wireless communication unit 54b receives advertising data broadcast-transmitted from the communication chip 42 included in the MFP 10.

The short-range wireless communication unit 54b executes short-range wireless communication (e.g., Bluetooth communication) with a communication target device specified on the basis of the advertising data or the like. For example, in this short-range wireless communication, wireless LAN communication information and the like can be acquired, and device registration processing (registration processing of wireless LAN communication information) (described below) can be executed on the basis of the acquired information. Note that the device registration processing based on the acquired information via short-range wireless communication is not unconditionally (immediately) performed after the information is acquired but is performed on condition that existence of a user of the portable terminal 50 in the vicinity of the MFP 10 is confirmed.

By using the information (IP address of communication target device, SSID regarding access point, and the like) acquired by the short-range wireless communication unit 54b, the wireless LAN communication unit 54a can perform wireless communication using a wireless LAN (specifically, wireless LAN communication using the access point) with the communication target device. However, wireless LAN communication of the portable terminal 50 can be executed only with a registered device after the above-mentioned device registration processing (described below).

The storage unit 55 includes a storage device such as a nonvolatile semiconductor memory.

The operation unit 56 includes an operation input unit 56a for accepting operation input to the portable terminal 50 and a display unit 56b for displaying and outputting various kinds of information. In the portable terminal 50, a touchscreen 75 (see FIG. 1) configured by embedding various sensors and the like in a liquid crystal display panel is provided. The touchscreen 75 also functions as a part of the operation input unit 56a and also functions as a part of the display unit 56b. The touchscreen 75 displays various operation screens (display screens) and the like and accepts, for example, operation input to the operation screens.

The image pickup unit 57 includes an image pickup element (e.g., CCD), an image pickup optical system, and the like for capturing an image of a subject. The image pickup unit 57 captures an image of, for example, a two-dimensional barcode (described below) displayed on the touchscreen 25.

The controller 59 in FIG. 3 is a control device that is included in the portable terminal 50 and comprehensively controls the portable terminal 50. The controller 59 is configured as a computer system including a CPU, various semiconductor memories (RAM and ROM), and the like. The controller 59 realizes various processing units by executing, in the CPU, a predetermined software program (hereinafter, also simply referred to as "program") stored in the storage unit 55 (nonvolatile semiconductor memory and the like). Note that the program (specifically, program module group) may be recorded on a portable recording medium such as a USB memory and be read out from the recording medium to be installed on the portable terminal 50. Alternatively, the program may be downloaded via a network or the like to be installed on the portable terminal 50.

A predetermined operating system (OS) 110 (see FIG. 3) is installed on the portable terminal 50, and the application program 120 (also simply referred to as "application") operating in the OS 110 is also installed thereon. For example, an application for causing the MFP 10 to print various electronic documents (also referred to as "printing application") is installed.

Specifically, the controller 59 executes the application 120 in the OS 110 to realize various processing units including a communication control unit 61, an input control unit 62, a display control unit 63, a confirmation unit 64, a registration control unit 65, and a recognition unit 67.

The communication control unit 61 is a processing unit that cooperates with the communication unit 54 and the like to control communication operation with the MFP 10 and the like.

The input control unit 62 is a control unit for controlling operation of operation input to the operation input unit 56a (touchscreen 75 and the like).

The display control unit 63 is a processing unit for controlling display operation in the display unit 56b (touchscreen 75 and the like). The display control unit 63 controls, for example, display operation of various display screens (201, 301, and the like) (described below).

The recognition unit 67 is a processing unit for executing two-dimensional barcode recognition processing (processing of recognizing a two-dimensional barcode (e.g., QR code (registered trademark)) included in a photographed image captured by the image pickup unit 57).

The confirmation unit 64 is a processing unit for controlling processing for confirming existence of a user who possesses the portable terminal 50 in the vicinity of the MFP 10. In this embodiment, the confirmation unit 64 cooperates with the recognition unit 67 and the like to confirm existence of the user in the vicinity of the MFP 10.

The registration control unit 65 is a processing unit for executing registration processing of registering communication information of the MFP 10 in the portable terminal 50 (OS 110 and/or application 120) in order to perform various kinds of communication (in particular, wireless LAN communication). For example, as described below, the registration control unit 65 executes the registration processing on condition that existence of a user of the portable terminal 50 in the vicinity of the MFP 10 is confirmed by the confirmation unit 64.

1-4. Operation

Figure 4:
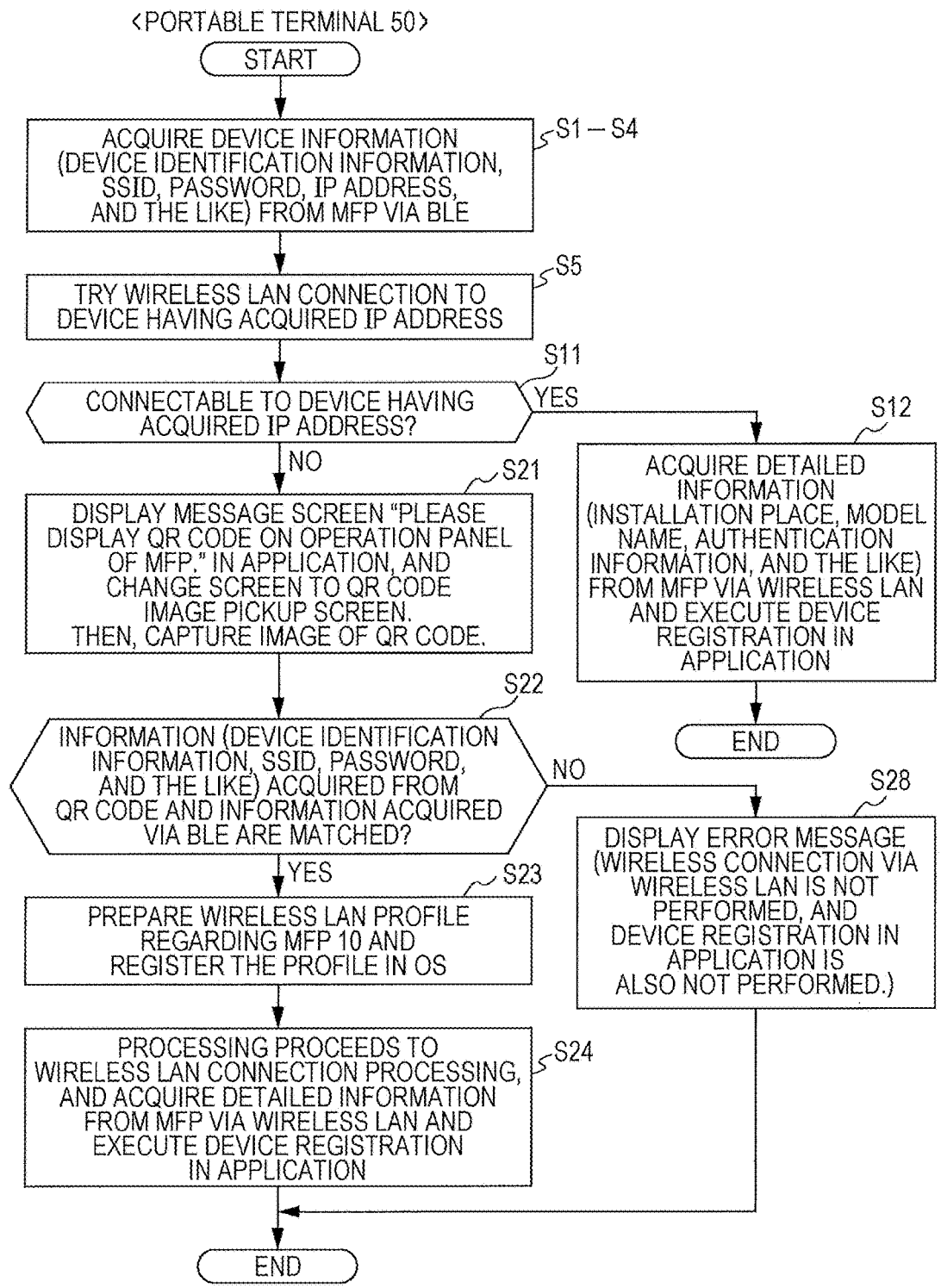
FIG. 4 is a flowchart showing operation of a portable terminal (application)
Figure 5:
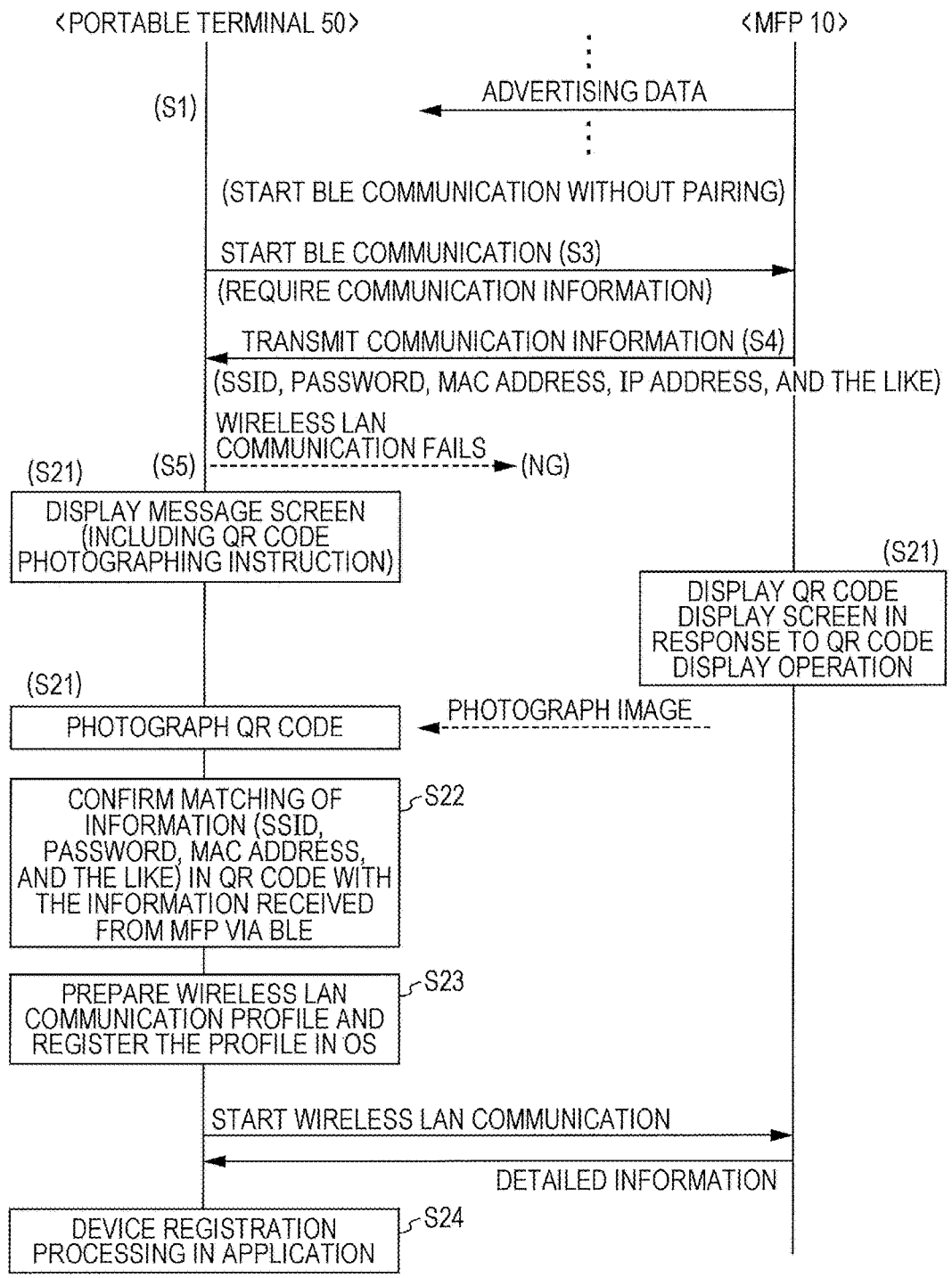
FIG. 5 is a sequence diagram showing operation of each device in this system.

In the first embodiment, operation regarding a function (device registration function) of registering, in the application 120, a device (image forming device) used by the application 120 will be mainly described. FIG. 4 is a flowchart showing operation of the application 120 of the portable terminal 50, and FIG. 5 is a sequence diagram showing operation of each device in this system 1. Operation in this system 1 (in particular, operation regarding the device registration function) will be described with reference to those drawings.

Figure 6:
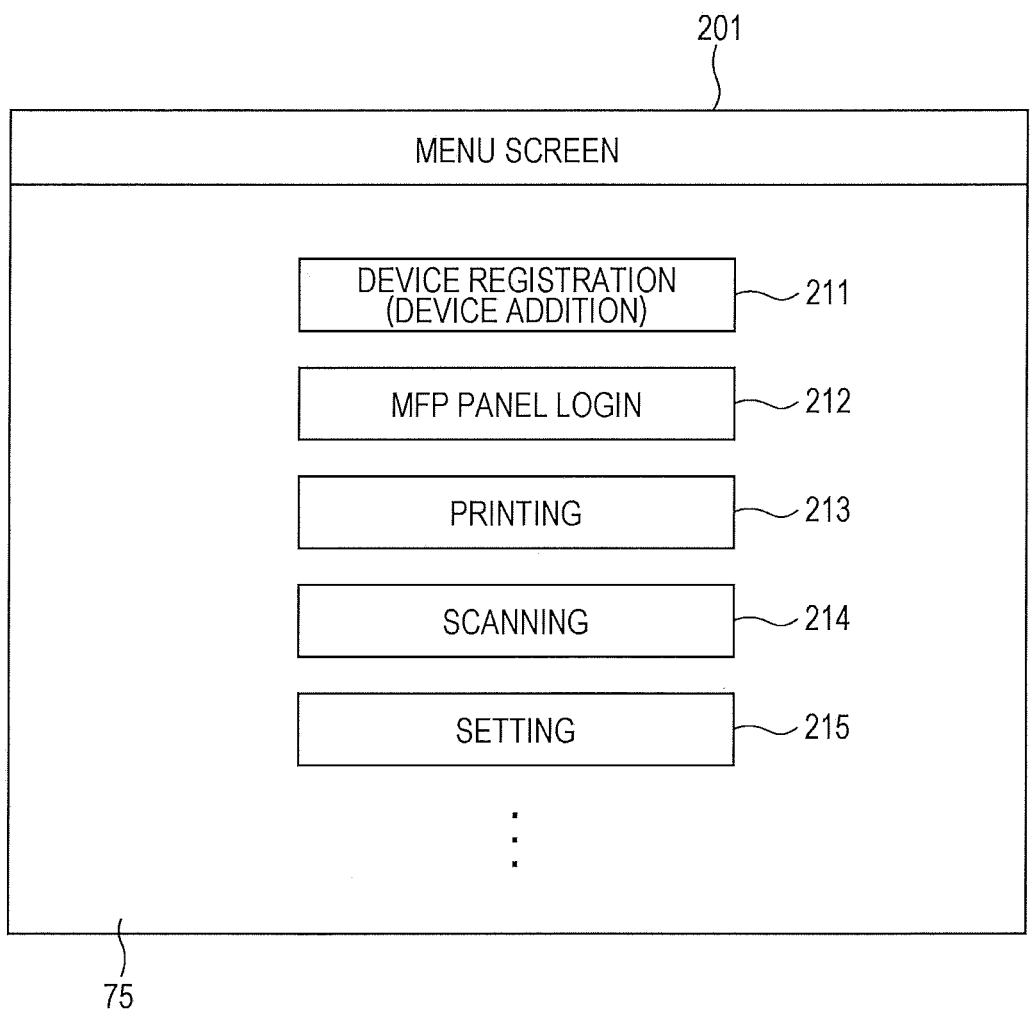
FIG. 6 shows a main menu screen.

When the application 120 is started in the portable terminal 50 in accordance with user operation in the portable terminal 50, a main menu screen 201 shown in FIG. 6 is displayed on the touchscreen 75.

The main menu screen 201 has a plurality of options ("device registration (device addition)" 211, "MFP panel login" 212, "printing" 213, "scanning" 214, "setting" 215, and the like).

When the "device registration" is selected from those options, operation regarding a function (device registration function) of registering, in this application 120, a device (image forming device) that a user desires to use is started. Such operation will be described below.

Figure 7:
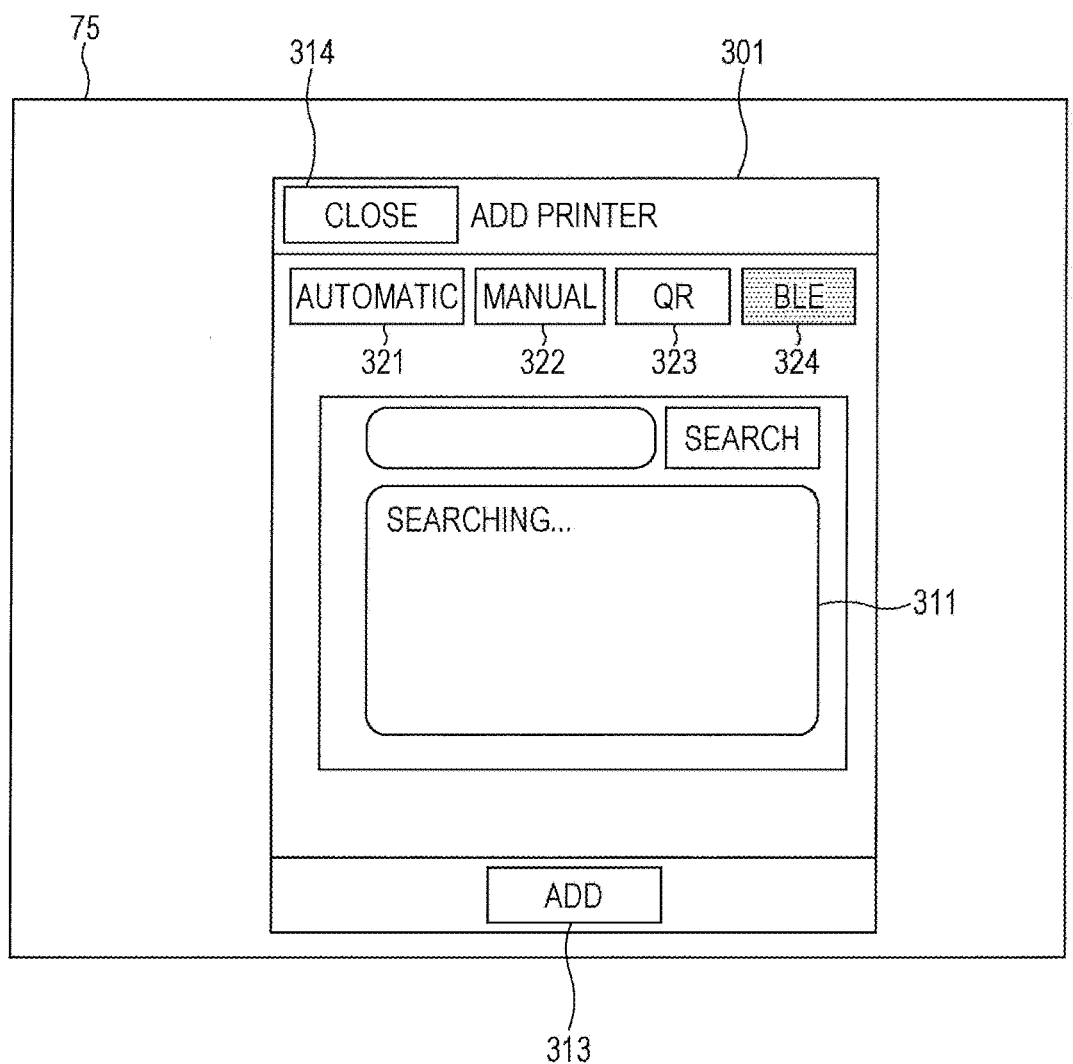
FIG. 7 shows a device registration screen.

Specifically, when the user of the portable terminal 50 selects the option "device registration" in the main menu screen 201, the portable terminal 50 displays a screen 301 (see FIG. 7) on the touchscreen 75. A plurality of options 321 to 324 ("automatic", "manual", "QR", and "BLE") regarding a device registration method is displayed in the screen 301. Further, when the user pushes the BLE button 324 in the screen 301 to select "device registration processing using BLE", the portable terminal 50 first starts BLE communication.

Specifically, the portable terminal 50 detects advertising data from the MFP 10 in the vicinity thereof (see step S1 in a top part of FIG. 5). Note that, at this time, for example, the wording "Searching . . . " is displayed in a message section 311 of the screen 301 (see FIG. 7).

Then, the portable terminal 50 specifies a transmission source device of the advertising data and executes BLE communication with the MFP 10 specified as the transmission source device. Specifically, the portable terminal 50 transmits a transmission request of communication information of the MFP 10 to the MFP 10 (see step S3 in FIG. 5), and, in response to the transmission request, the MFP 10 transmits the communication information of the MFP 10 to the portable terminal 50 (see step S4 in FIG. 5). The portable terminal 50 receives the communication information and the like from the MFP 10 and thus acquires the communication information and the like. The communication information contains, for example, device identification information (e.g., MAC address) of the MFP 10 and wireless LAN communication information (SSID, password, and IP address) of the MFP 10. Note that, in this BLE communication (Bluetooth communication), data is transmitted/received without executing pairing processing between the MFP 10 and the portable terminal 50 (in particular, pairing processing with user confirmation (pairing processing using a "Numeric Comparison" method, a "Passkey Entry" method, or the like)).

Next, the portable terminal 50 specifies a communication destination device by using the "IP address" in the wireless LAN communication information acquired via BLE communication (step S4) and tries wireless LAN communication with the MFP 10 serving as the specified communication destination device (step S5). Note that, at this stage, processing of registering the information acquired in step S4 in the portable terminal 50 has not yet been executed. In wireless LAN communication (trial communication) in step S5, regarding the information (SSID and password) on the communication destination device (MFP 10) other than the "IP address", only information registered in advance is used, and the information acquired in step S4 is not used.

Then, based on success or failure of the wireless LAN communication (a result of trial of wireless LAN communication), the portable terminal 50 determines whether or not registration processing of communication information for executing wireless LAN communication with the MFP 10 (specifically, information containing not only an IP address but also an SSID and a password (also referred to as "wireless LAN communication information")) has already been completed in the application 120 (step S11).

Assuming that registration of the wireless LAN communication information on the MFP 10 has already been completed in the application 120, the registered information (SSID and password) is also automatically used to perform wireless LAN communication. As a result, the wireless LAN communication succeeds between the portable terminal 50 and the MFP 10.

On the contrary, in the case where registration of the wireless LAN communication information on the MFP 10 has not yet been completed in the application 120, wireless LAN communication is performed without using the SSID or the password. As a result, the wireless LAN communication fails between the portable terminal 50 and the MFP 10.

By using such a characteristic, the portable terminal 50 determines presence/absence of registration of the wireless LAN communication information on the MET 10 on the basis of success or failure of wireless LAN communication (a result of trial of wireless LAN communication). Specifically, in the case where wireless LAN communication succeeds, it is determined that registration of the wireless LAN communication information on the MFP 10 has already been completed in the application 120. On the contrary, in the case where wireless LAN communication fails, it is determined that registration of the wireless LAN communication information on the MFP 10 has not yet been completed in the application 120.

Divergence processing based on a result of this determination is performed (step S11).

In the case where the wireless LAN communication in step S5 succeeds and it is determined that registration of the wireless LAN communication information on the MFP 10 has already been completed, the processing proceeds from step S11 to step S12.

Figure 8:
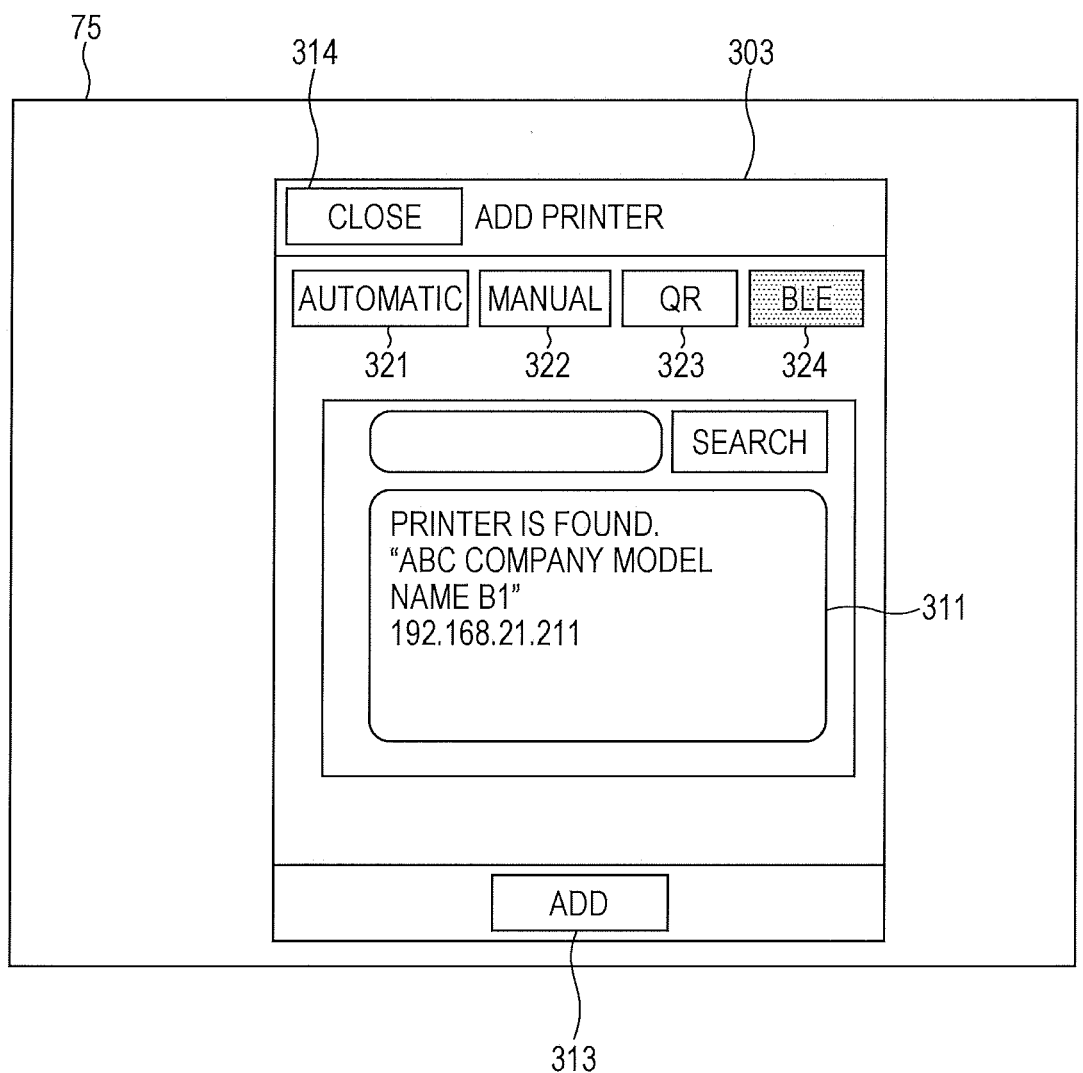
FIG. 8 shows a device registration screen.

In step S12, the portable terminal 50 changes over from BLE communication to wireless LAN communication and requires the MFP 10 to transmit detailed information on the MFP 10 via wireless LAN communication. In response to this request, the MFP 10 transmits the detailed information on the MFP 10 (installation place, model name, authentication information, and the like) to the portable terminal 50 via wireless LAN communication. The portable terminal 50 receives the detailed information from the MFP 10 and displays a screen 303 (FIG. 8) on the touchscreen 75.

In the screen 303, a message indicating that, for example, communication with the communication destination device via wireless LAN communication has succeeded ("Printer is found.") is displayed in the display section 311, and a button 313 for instructing device registration of the communication destination device (MFP 10) in the application 120 is displayed. When the user pushes the button 313 to give a registration instruction (addition instruction), device information on the MFP 10 (IP address, SSID for wireless LAN, password for wireless LAN, MAC address, installation place, model name, authentication information, and the like) is registered in the application 120.

Figure 9:
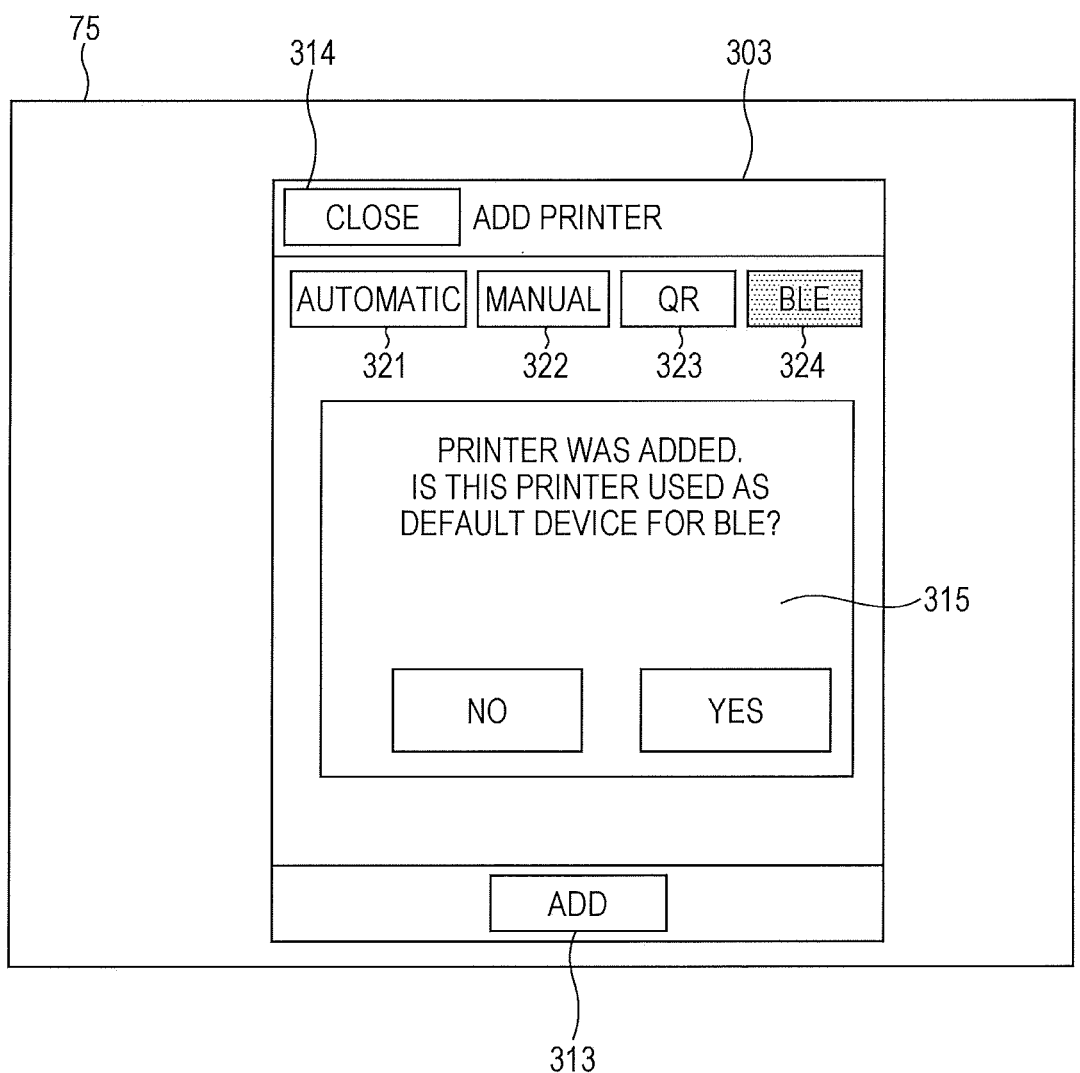
FIG. 9 shows a dialog screen.

Then, a dialog screen 315 shown in FIG. 9 is displayed, and whether to register the target device (MFP 10) in the current addition processing (registration processing) in the application 120 as a default device is confirmed. When a "yes" button in the dialog screen 315 is pushed, the MFP 10 is registered as a default device. On the contrary, when a "no" button in the dialog screen 315 is pushed, the MFP 10 is not registered as a default device.

In step S12, the above processing is performed.

In the case where wireless LAN communication in step S5 fails and it is determined that the registration processing of the wireless LAN communication information on the MFP 10 has not yet been completed, the processing proceeds from step S11 to step S21. In other words, on condition that it is determined that the registration processing has not yet been completed, processing in steps S21 and S22 (described below) is executed, and whether to permit the registration processing is determined.

Figure 10:
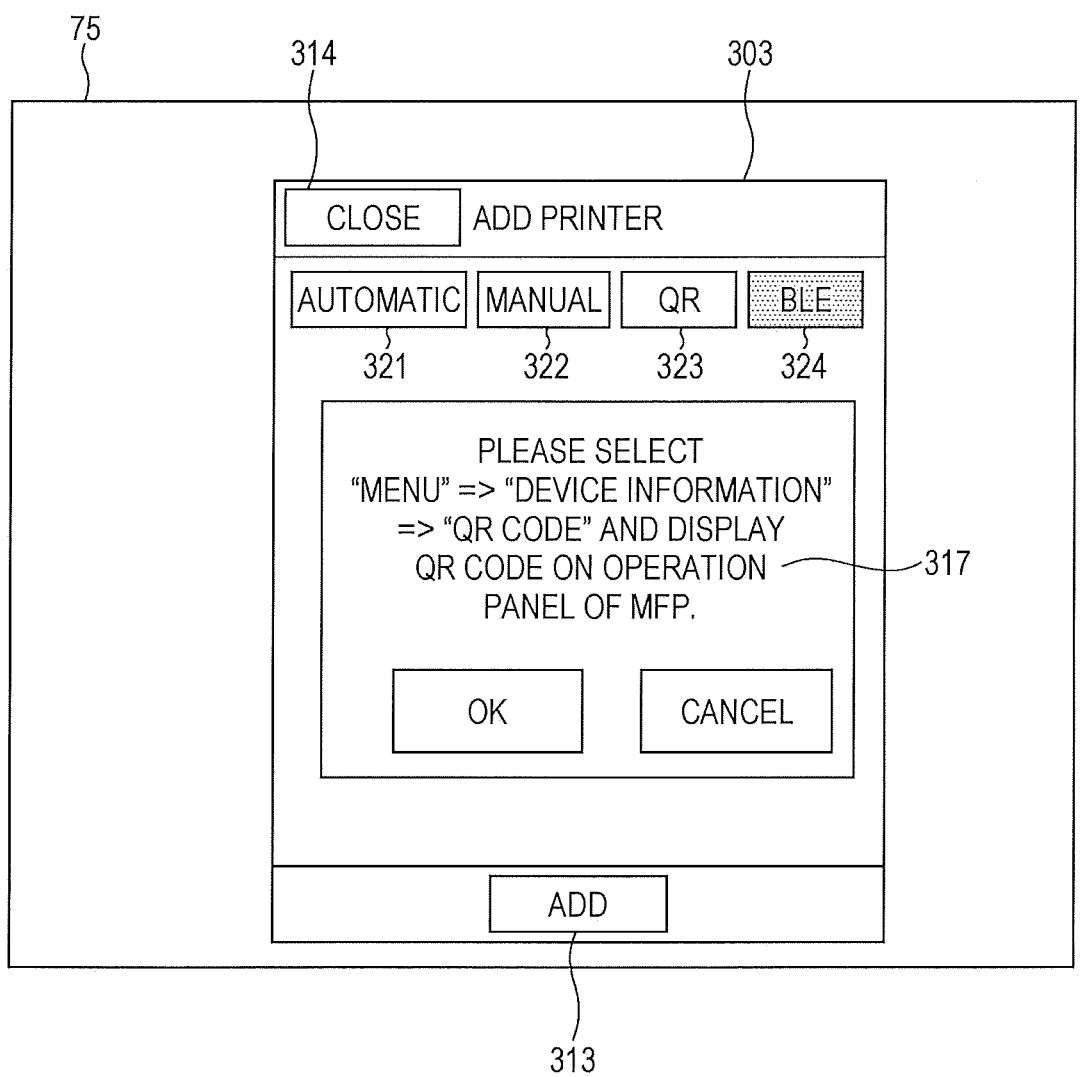
FIG. 10 shows a dialog screen.

In step S21, the portable terminal 50 displays a dialog screen 317 shown in FIG. 10 on the touchscreen 75. In the dialog screen (message screen) 317, the wording describing how to display a QR code (two-dimensional barcode), the wording "Please display the QR code on the operation panel of the MFP.", and the like are written.

Figure 11:
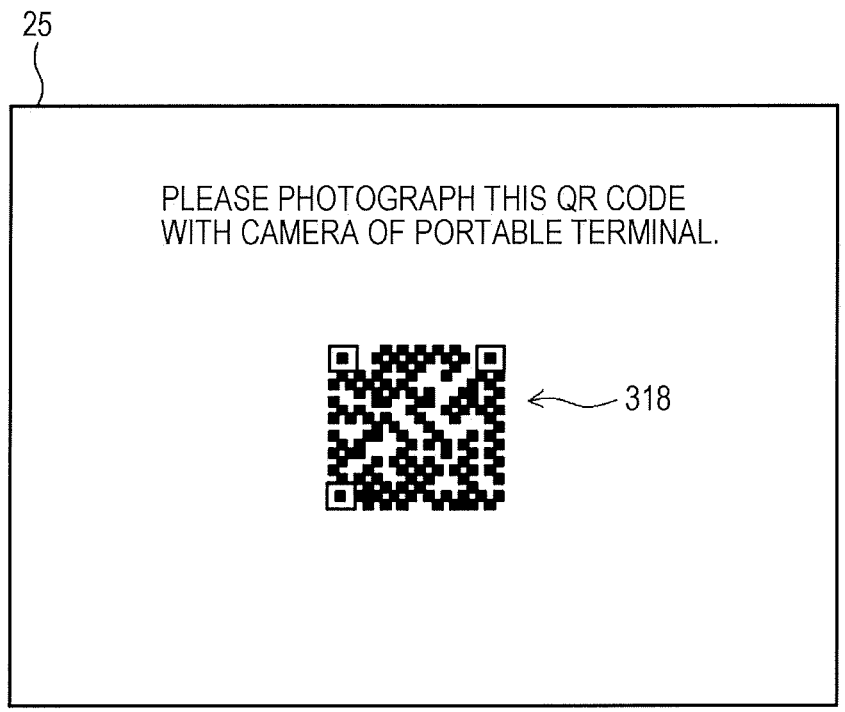
FIG. 11 shows a state in which a two-dimensional barcode is displayed on an MFP.

Next, the user performs menu selection operation or the like by using the operation panel unit 6c (touchscreen 25 and the like) of the MFP 10 while referring to a display content in the dialog screen 317, thereby displaying a two-dimensional barcode (QR code) 318 (see FIG. 11) on the touchscreen 25 of the MFP 10. The two-dimensional barcode 318 is generated by the MFP 10 and is displayed on the touchscreen 25 of the MET 10. In the two-dimensional barcode 318, device identification information (e.g., MAC address) of the MFP 10, wireless LAN communication (wireless LAN connection) information (SSID, password, and IP address) of the MFP 10, and the like are embedded.

When an OK button in the dialog screen 317 is pushed, the portable terminal 50 transitions to a photographing mode using the image pickup unit 57 thereof (specifically, a photographing mode for recognizing the two-dimensional barcode). The user moves the user's portable terminal 50 to the vicinity of the touchscreen 25 to capture an image of the two-dimensional barcode displayed on the touchscreen 25 of the MFP 10 by using the image pickup unit 57 of the portable terminal 50. The portable terminal 50 (recognition unit 67 and the like) analyzes the photographed image (photographed image including the two-dimensional barcode) captured by the image pickup unit 57 and extracts the information embedded in the two-dimensional barcode.

Then, in step S22, the portable terminal 50 compares (collates) the information acquired from the two-dimensional barcode (step S21) with the information acquired via BLE communication (steps S1 to S4). In short, pieces of the information acquired via two different paths are compared.

In step S22, for example, whether or not three pieces of the information (SSID, password, and MAC address) acquired from the two-dimensional barcode are matched with three respective pieces of the information (SSID, password, and MAC address) acquired via BLE communication is determined. Based on a result of this determination, whether or not the user who possesses the portable terminal 50 exists in the vicinity of the MFP 10 is further determined.

In the case where, among three kinds of information (six pieces of information in total) acquired via the two different paths, not all the pieces of information of the same kind acquired via the two paths are matched, it is determined that the portable terminal 50 does not exist in the vicinity of the MFP 10. For example, in the case where the SSID acquired from the two-dimensional barcode and the SSID acquired via BLE communication are not matched, it is determined that the portable terminal 50 does not exist in the vicinity of the MFP 10. Then, the processing proceeds from step S22 to step S28.

As described above, in the case where identity of the pieces of the information acquired via the two different paths is denied, it is determined that the portable terminal 50 does not exist in the vicinity of the MFP 10, and the processing proceeds to step S28.

In step S28, the portable terminal 50 displays an error message on the touchscreen 75. In this case, the processing in steps S23 and S24 (described below) is not performed.

On the contrary, in the case where, among the three kinds of information (six pieces of information in total) acquired via the two different paths, all the pieces of information of the same kind (corresponding pieces of information) acquired via the two paths are matched, it is determined (confirmed) that the portable terminal 50 exists in the vicinity of the MFP 10. In this case, the processing proceeds from step S22 to step S23. As described above, in the case where it is confirmed that the pieces of the information acquired via the two different paths are matched with each other, it is determined that the portable terminal 50 exists in the vicinity of the MFP 10, and the processing proceeds to step S23.

Note that, herein, although collation operation regarding the three kinds of information (SSID, password, and MAC address) is performed in step S22, the collation operation is not limited thereto. For example, the collation operation regarding more kinds of information (e.g., four or more kinds of information also including the IP address and the like) may be performed. Alternatively, the collation operation regarding comparatively few kinds of information may be performed. However, when the collation operation is performed by using comparatively many kinds of information, it is possible to comparatively reduce possibility of unauthorized access.

Figure 12:
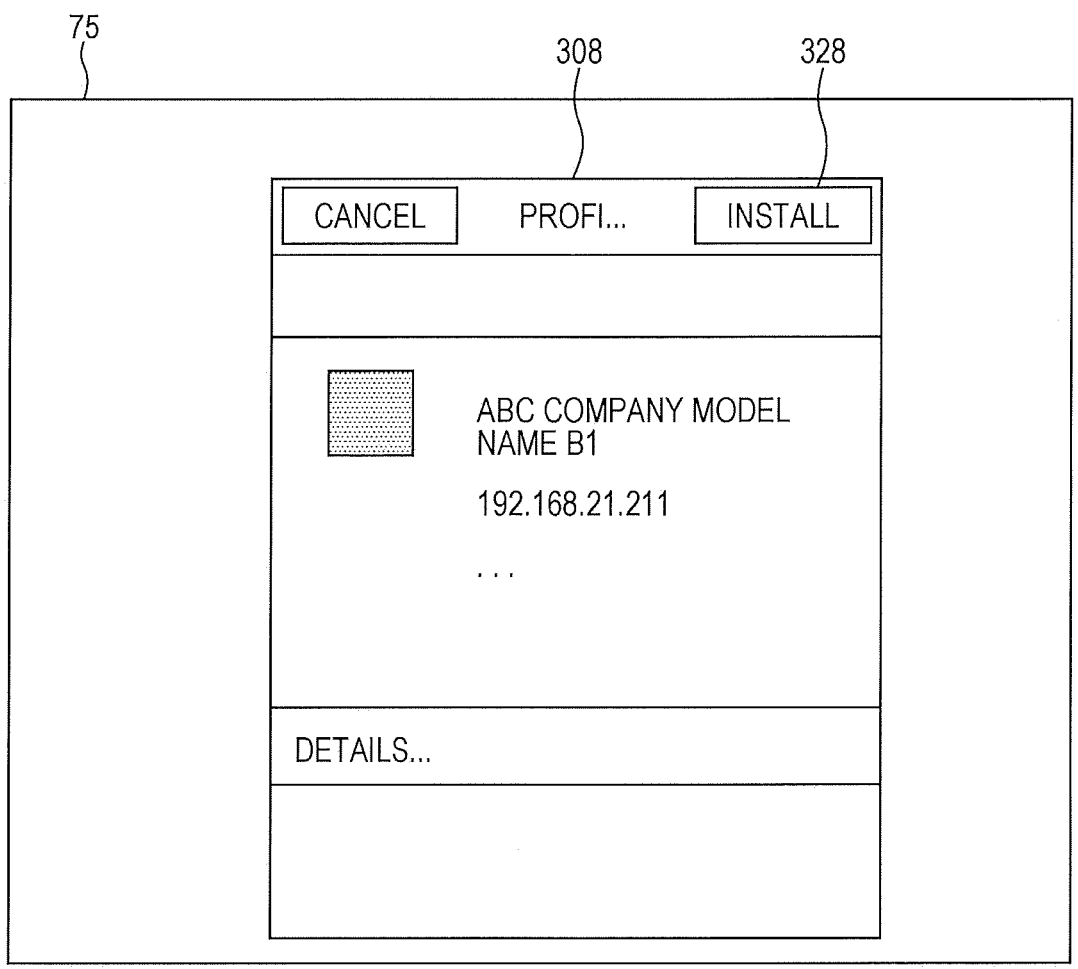
FIG. 12 shows a profile registration screen.

In step S23, the portable terminal 50 prepares a wireless LAN communication profile (data) regarding the MFP 10 on the basis of the information acquired in step S4 (and/or the information acquired in step S21). The profile includes the information (SSID, password, and the like) for wireless LAN communication with the image forming device 10. Further, the portable terminal 50 displays a screen (profile registration screen) 308 (see FIG. 12) for registering the profile in the OS 110. When an install button 328 in the profile registration screen 308 is pushed by the user, the portable terminal 50 installs the profile. In this way, the profile is registered in the OS 110. Note that registration processing of the profile is also expressed as registration processing of registering the communication information (SSID, password, and the like) for wireless LAN communication with the MFP 10 in the portable terminal 50 in order to execute the wireless LAN communication.

As described above, in step S23, the profile registration processing or the like is permitted on condition that existence of the user of the portable terminal 50 in the vicinity of the MFP 10 is confirmed.

Thereafter, in step S24, processing similar to the processing in step S12 is executed. Specifically, the portable terminal 50 changes over from BLE communication to wireless LAN communication and requires the MFP 10 to transmit detailed information on the MFP 10 via wireless LAN communication. In response to this request, the MFP 10 transmits the detailed information on the MFP 10 (installation place, model name, authentication information, and the like) to the portable terminal 50 via wireless LAN communication. The portable terminal 50 receives the detailed information from the MFP 10 and displays the screen 303 (FIG. 8) on the touchscreen 75. Thereafter, when the user pushes the button 313 to give a registration instruction (addition instruction), the device information on the MFP 10 (IP address, SSID for wireless LAN, password for wireless LAN, MAC address, installation place, model name, authentication information, and the like) is registered in the application 120. Further, the dialog screen 315 (FIG. 9) is displayed, and whether to perform registration processing of registering the MFP as a default device is confirmed.

According to the above operation, first, an IP address for use in wireless LAN communication is acquired via BLE communication, and, based on success or failure of communication using the IP address, whether or not communication information such as an SSID and a password is registered in the portable terminal 50 is determined (step S11). In the case where it is determined that the communication information has not yet been registered in the portable terminal 50, registration processing of the communication information is not immediately executed but processing of confirming "existence of a user who possesses the portable terminal 50 in the vicinity of the MFP 10" (steps S21, S22) is first executed. Then, on condition that existence of the user in the vicinity of the MFP 10 is confirmed, registration processing (profile registration processing or the like) of registering the communication information (SSID, password, and the like) for wireless LAN communication with the MFP 10 in the portable terminal 50 in order to perform the wireless LAN communication is permitted (step S23). Therefore, it is possible to prevent a user (distant user) who does not exist in the vicinity of the MFP 10 from performing the profile registration or the like and to prevent the distant user from accessing the MFP 10.

Even in the case where pairing processing between the MFP 10 and the portable terminal 50 in BLE communication (in particular, pairing processing with user confirmation ("Numeric Comparison" method, "Passkey Entry" method, or the like)) is not executed, existence of the user in the vicinity of the MFP 10 is confirmed by using, for example, a photographed image of a two-dimensional barcode, and then the profile registration processing or the like is permitted. Therefore, even in the case where the pairing processing is not executed, it is possible to appropriately prevent a distant user from accessing the MFP 10.

2. Second Embodiment

A second embodiment is a modification example of the first embodiment. A difference from the first embodiment will be mainly described below.

In the above first embodiment, existence of a user who possesses the portable terminal 50 in the vicinity of the MFP 10 is confirmed by using a two-dimensional barcode.

In the second embodiment, existence of a user who possesses the portable terminal 50 in the vicinity of the MFP 10 is confirmed by using an NFC tag.

Figure 13:
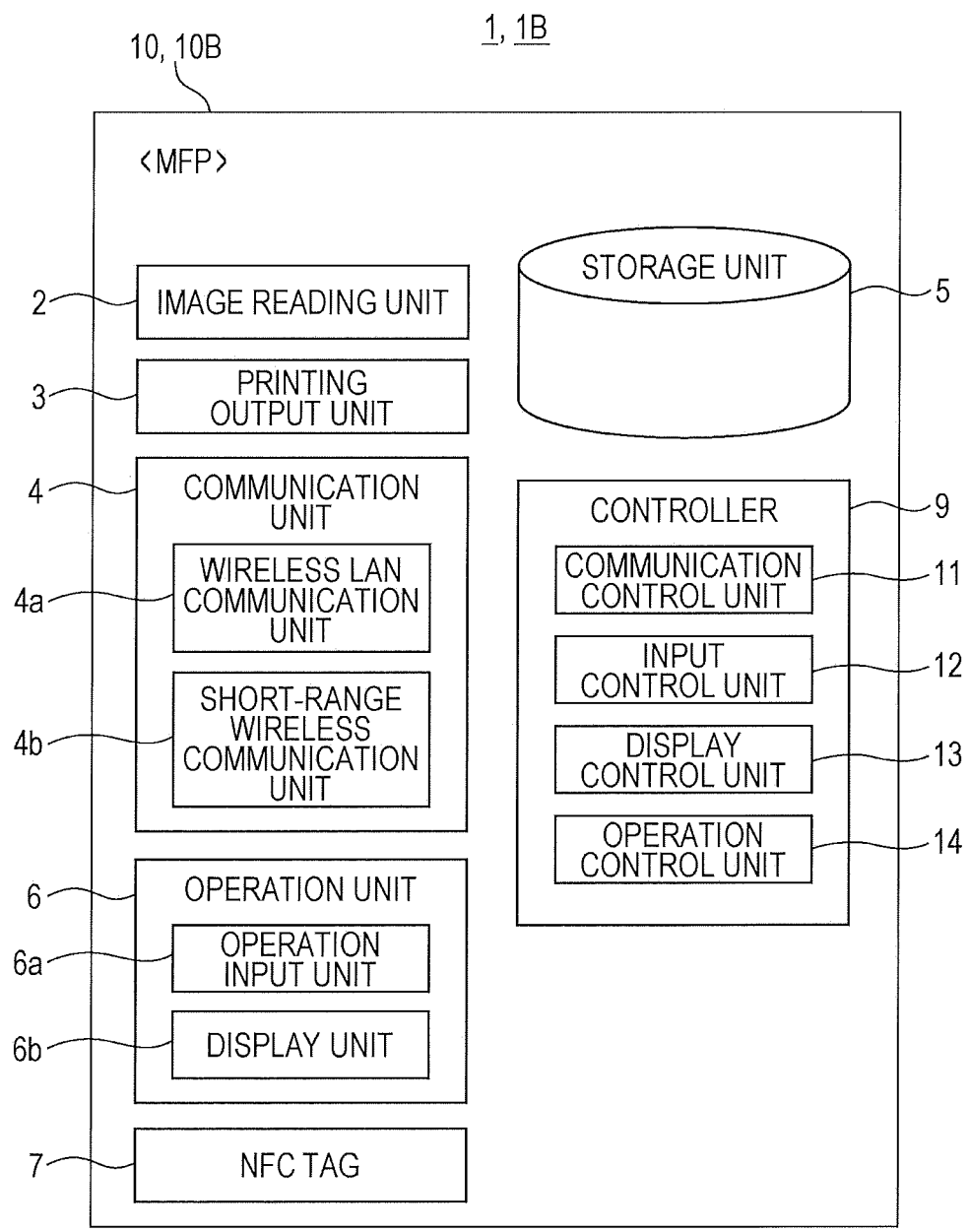
FIG. 13 is a functional block diagram showing a schematic configuration of an MFP according to a second embodiment.

An MFP 10 (10B) according to the second embodiment (see FIG. 13) also includes an NFC tag 7. The NFC tag 7 is provided in the vicinity of, for example, a surface of the operation panel unit 6c of the MFP 10 (or a main body unit or the like of the MFP 10). In the NFC tag 7, for example, device identification information (e.g., MAC address) of the MFP 10 is embedded.

Figure 14:
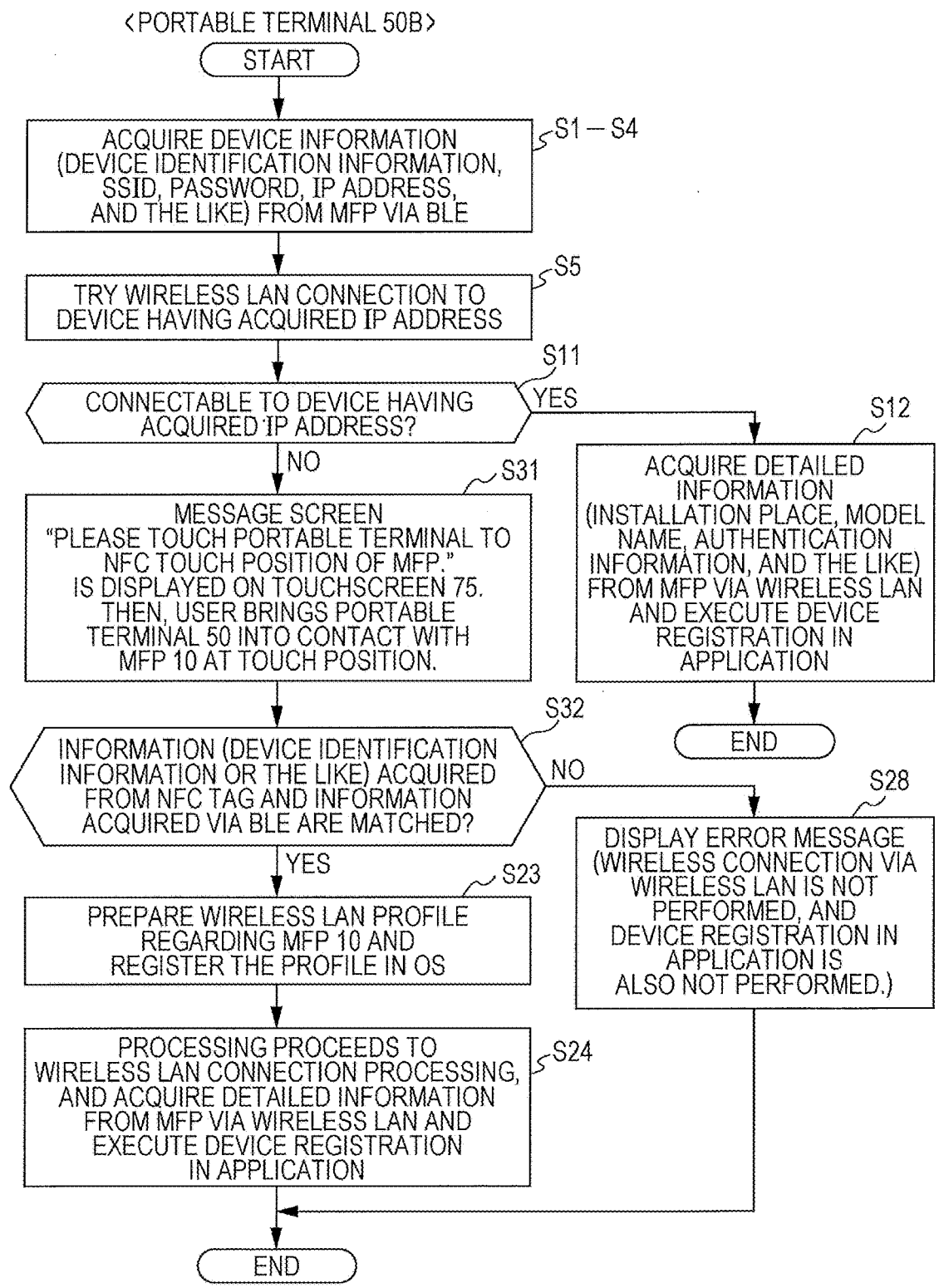
FIG. 14 is a flowchart showing operation of a portable terminal (application) according to the second embodiment.
Figure 15:
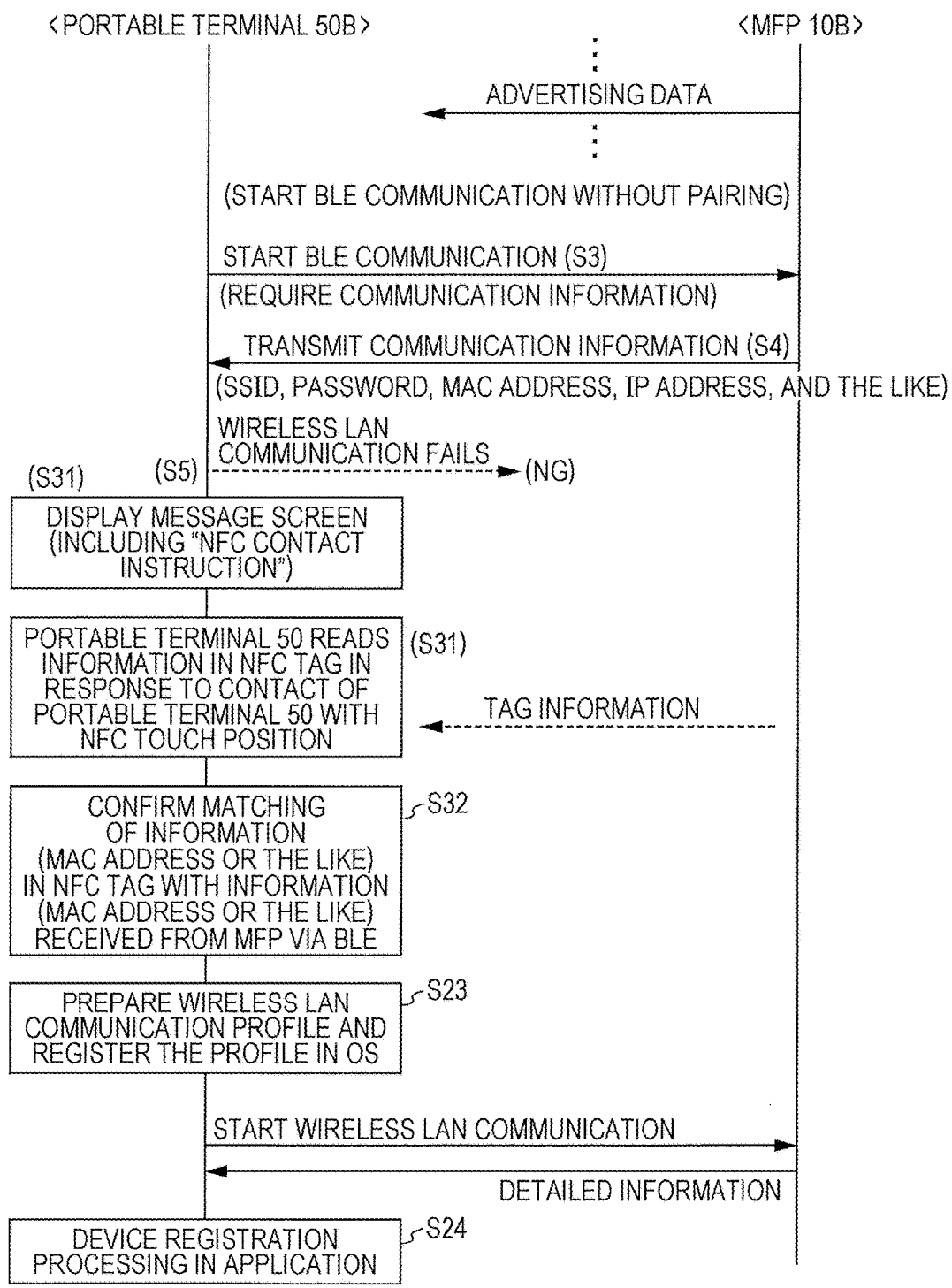
FIG. 15 is a sequence diagram showing operation of each device in a system according to the second embodiment.

FIG. 14 is a flowchart showing operation of an application 120 (also referred to as "120B") of a portable terminal 50 (also referred to as "50B") according to the second embodiment, and FIG. 15 is a sequence diagram showing operation of each device in a system 1 (1B) according to the second embodiment. Operation in the system 1B will be described with reference to those drawings.

As is clear from comparison between FIG. 14 and FIG. 4, operation according to the second embodiment is different from the operation according to the first embodiment in that processing in steps S31 and S32 is performed instead of steps S21 and S22. Note that, in steps S1 to S5, S11, S12, S23, S24, and S28, operation similar to the operation in FIG. 4 is performed.

Specifically, in the case where wireless LAN communication in step S5 fails and it is determined that registration of wireless LAN communication information on the MFP 10 has not yet been completed, the processing proceeds from step S11 to step S31.

In step S31, the portable terminal 50 displays a dialog screen (not shown) on the touchscreen 75. In the dialog screen (message screen), for example, the wording "Please touch the portable terminal to an NFC touch position of the MFP." (instruction that brings the portable terminal 50 into contact with (causes the portable terminal 50 to approach to) the NFC tag of the MFP (NFC tag reading instruction)) is written.

Next, the user brings the portable terminal 50 into contact with (causes the portable terminal 50 to approach to) the touch position of the MFP 10 (e.g., a predetermined position in the operation panel unit 6c) while referring to a display content of the dialog screen.

The portable terminal 50 communicates with the NFC tag 7 in the MFP 10 by using an NFC communication unit (also referred to as "NFC reader" (or "information reading unit")) or the like) included in the short-range wireless communication unit 54b and reads information in the NFC tag 7 to acquire the information. Specifically, the portable terminal 50 acquires the device identification information (e.g., MAC address) of the MFP 10 from the NFC tag 7.

Then, in step S32, the portable terminal 50 compares (collates) the information (specifically, MAC address) acquired from the NFC tag 7 (step S31) with information (specifically, MAC address) acquired via BLE communication (steps S1 to S4). In short, pieces of the information acquired via two different paths are compared.

In the case where identity of the pieces of the information acquired via the two different paths is denied, the processing proceeds to step S28.

On the contrary, when it is confirmed that the pieces of the information acquired via the two different paths are identical, existence of the portable terminal 50 in the vicinity of the MFP 10 is determined (confirmed), and the processing proceeds to step S23. In step S23, as in the first embodiment, preparation processing of a wireless LAN communication profile, registration processing of the profile, and the like are executed on the basis of the information (MAC address, SSID, password, IP address, and the like) acquired in step S4 and/or the like. In the next step S24, as in the first embodiment, BLE communication changes over to wireless LAN communication, and, for example, processing (device registration processing) of registering, in the application 120, device information also containing information acquired by using the wireless LAN communication is executed.

According to the above operation, it is possible to obtain an effect similar to the effect of the first embodiment. In particular, in the second embodiment, it is possible to confirm existence of a user of the portable terminal 50 in the vicinity of the MFP 10 by using an NFC tag or the like instead of a two-dimensional barcode. Specifically, existence of the user in the vicinity of the MFP 10 is confirmed on condition that information acquired in step S31 and information acquired in steps S1 to S4 are matched. Then, on condition that existence of the user in the vicinity of the MFP 10 is confirmed, registration processing (profile registration processing or the like) of registering communication information (SSID, password, and the like) for wireless LAN communication with the MFP 10 in the portable terminal 50 in order to perform the wireless LAN communication is permitted (step S23). Therefore, it is possible to prevent a user (distant user) who does not exist in the vicinity of the MFP 10 from performing the profile registration and the like and to prevent the distant user from accessing the MFP 10.

Note that, in the above second embodiment, although only a single piece of information (MAC address) is stored in the NFC tag 7, the information is not limited thereto, and a plurality of pieces of information (information also containing (all or part of) wireless LAN communication information (SSID, password, and IP address) of the MFP 10 and the like) may be stored. In that case, in step S32, collation processing regarding each of a plurality of kinds of information may be executed.

3. Third Embodiment

A third embodiment is a modification example of the first embodiment. A difference from the first embodiment will be mainly described below.

In the above first embodiment, existence of a user who possesses the portable terminal 50 in the vicinity of the MFP 10 is confirmed by using a two-dimensional barcode.

In the third embodiment, existence of a user who possesses the portable terminal 50 in the vicinity of the MET 10 is confirmed by using an IC card (IC card possessed by the user of the portable terminal 50). The IC card is, for example, a contactless IC card such as "Suica" (registered trademark).

Figure 16:
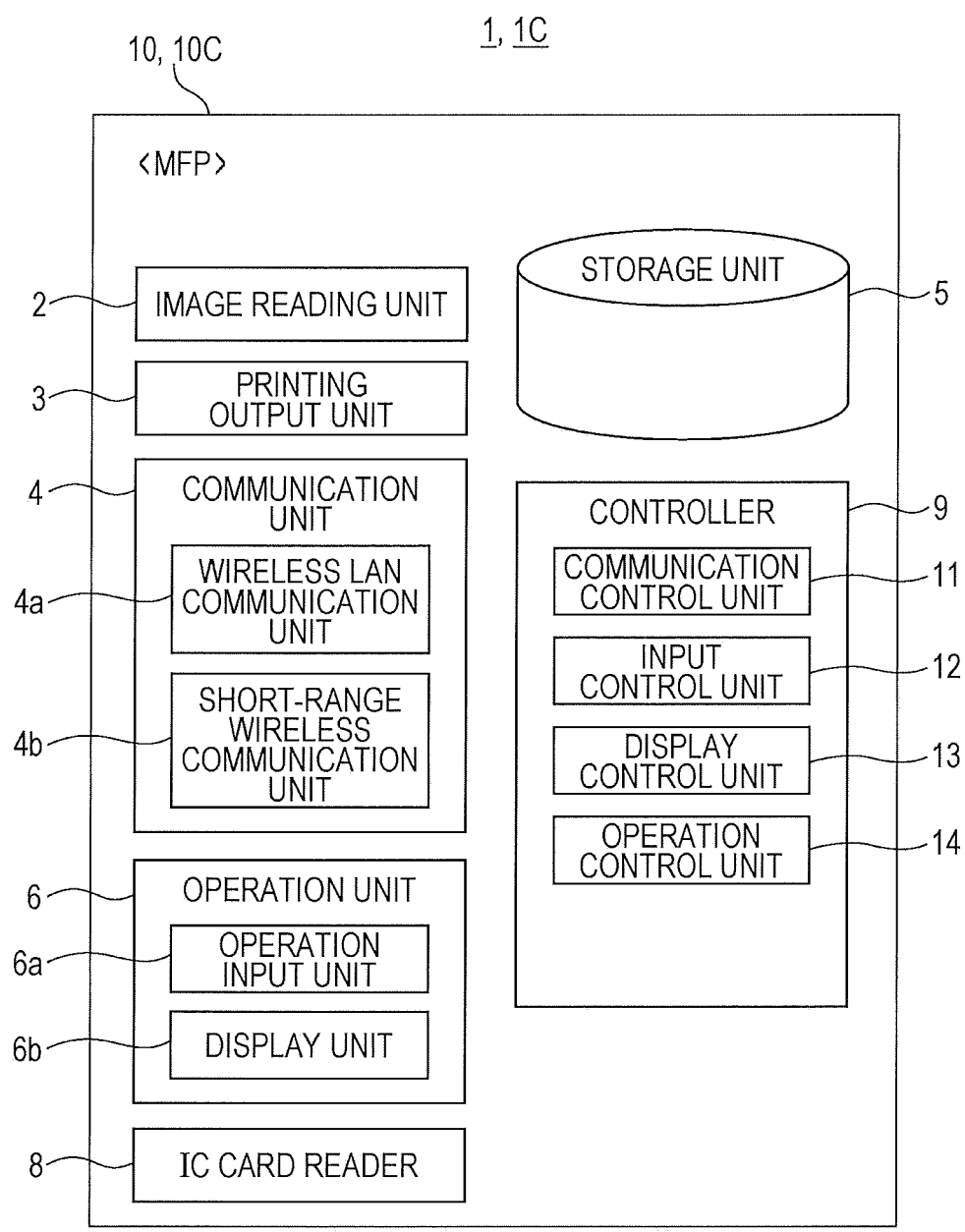
FIG. 16 is a functional block diagram showing a schematic configuration of an MFP according to a third embodiment.

An MFP 10 (10C) according to the third embodiment (see FIG. 16) also includes an IC card reader 8. The IC card reader 8 is provided in the vicinity of, for example, a surface of the operation panel unit 6c of the MFP 10 (or a main body unit or the like of the MFP 10). As described below, information in an IC card (card identification information (card number)) is read by the IC card reader 8, and the read information is transmitted to the portable terminal 50 from the MFP 10 by using BLE communication. In this way, the portable terminal 50 acquires the card identification information of the IC card of the user via the MFP 10.

Figure 17:
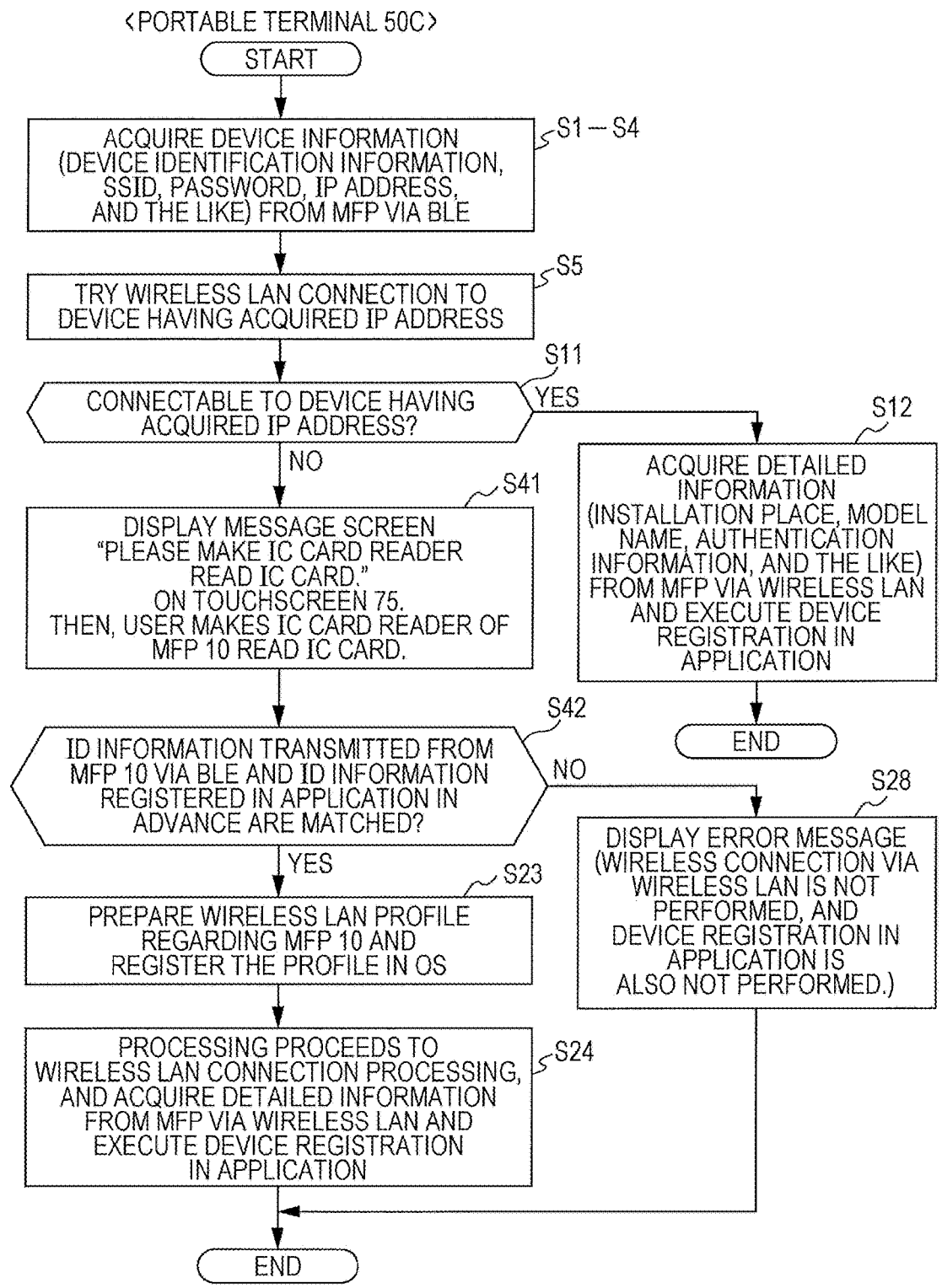
FIG. 17 is a flowchart showing operation of a portable terminal (application) according to the third embodiment.
Figure 18:
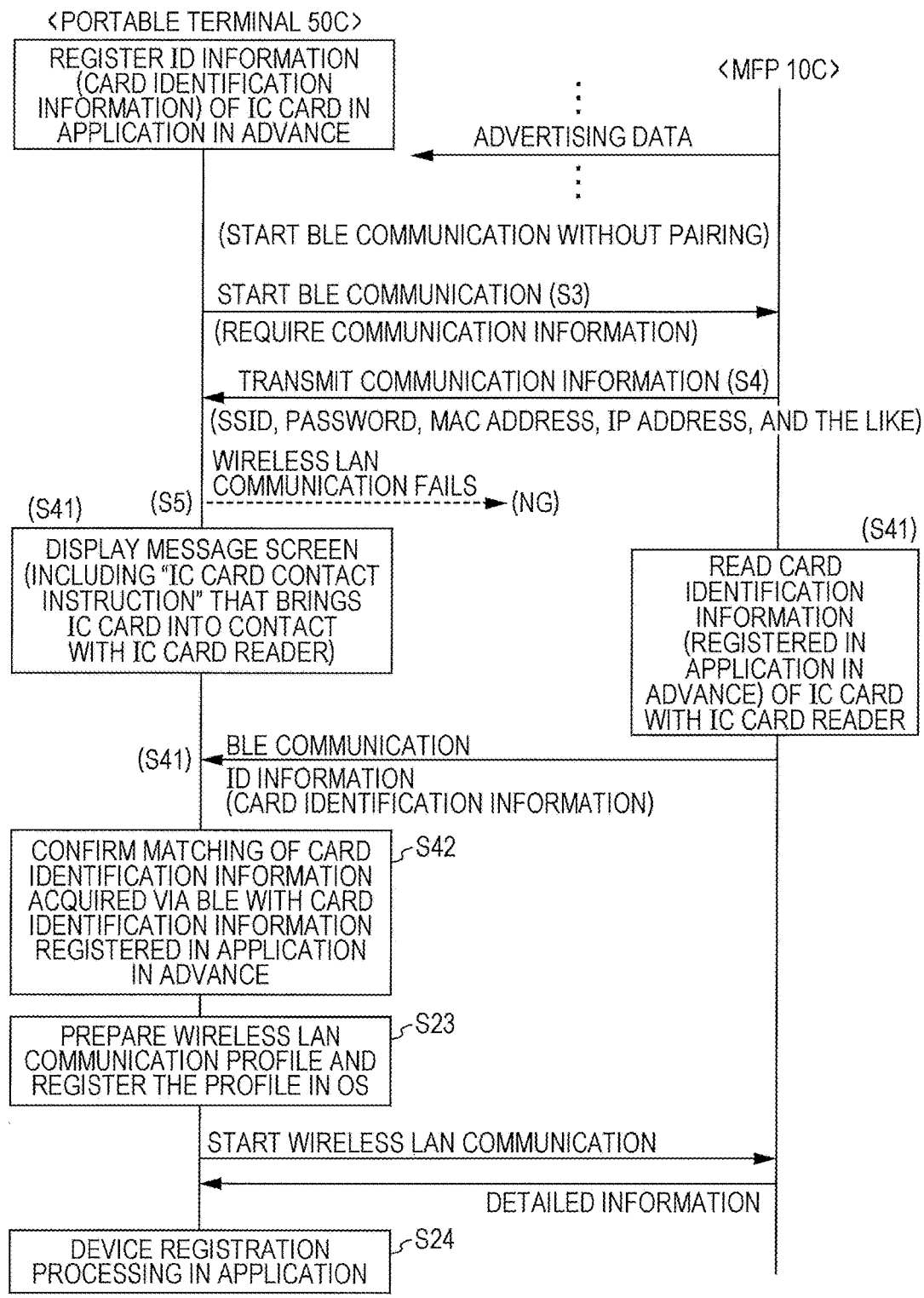
FIG. 18 is a sequence diagram showing operation of each device in a system according to the third embodiment.

FIG. 17 is a flowchart showing operation of an application 120 (also referred to as "120C") of a portable terminal 50 (also referred to as "50C") according to the third embodiment, and FIG. 18 is a sequence diagram showing operation of each device in a system 1 (1C) according to the third embodiment. Operation in the system 1C will be described with reference to those drawings.

As is clear from comparison between FIG. 17 and FIG. 4, operation according to the third embodiment is different from the operation according to the first embodiment in that processing in steps S41 and S42 is performed instead of steps S21 and S22. Note that, in steps S1 to S5, S11, S12, S23, S24, and S28, operation similar to the operation in FIG. 4 is performed.

As shown in a top part of FIG. 18, before processing in FIG. 17 is performed, ID information (card identification number) of an IC card of a user of the portable terminal 50 is registered in the application 120 in advance. Specifically, the user of the portable terminal 50 performs operation of registering a desired IC card among the user's IC cards in the application 120 as an IC card that can be used for communication with the MFP 10. Specifically, operation of registering the card identification number of the IC card to be registered is performed. Based on the operation by the user, the portable terminal 50 registers the card identification information of the IC card to be registered in the application 120.

In the third embodiment, first, the processing in steps S1 to S5 and S11 is executed in the same way as the first embodiment.

Then, in the case where wireless LAN communication in step S5 fails and it is determined that registration of wireless LAN communication information on the MFP 10 has not yet been completed, the processing proceeds from step S11 to step S41.

In step S41, the portable terminal 50 displays a dialog screen (not shown) on the touchscreen 75. In the dialog screen (message screen), for example, the wording "Please touch the IC card to a card touch position of the MFP." (instruction that brings the IC card into contact with (causes the IC card to approach to) the IC card reader of the MFP (IC card approaching instruction)) is written.

Next, the user brings the IC card into contact with (causes the IC card to approach to) the touch position of the MFP 10 (e.g., a predetermined position in the operation panel unit 6c) while referring to a display content of the dialog screen.

The MFP 10 reads card identification information (card number) in the IC card by using the IC card reader 8. Then, the MFP 10 transmits the read information (card identification information) to the portable terminal 50 by using BLE communication (see also FIG. 18).

The portable terminal 50 receives information transmitted from the MFP 10 via BLE communication to acquire the card identification information of the IC card. In other words, the portable terminal 50 receives the card identification information read by the IC card reader of the MFP 10 (card identification information of the IC card of the user of the portable terminal 50) from the MFP 10 by using BLE communication and thus acquires the card identification information.

Then, in step S42, the portable terminal 50 compares (collates) the card identification information read and transmitted by the MFP 10 (step S41) with the card identification information registered in the application 120 in advance before step S1. In short, pieces of the information acquired via two different paths are compared.

In the case where identity of the pieces of the information acquired via the two different paths is denied, the processing proceeds to step S28.

On the contrary, when it is confirmed that the pieces of the information acquired via the two different paths are identical, existence of the portable terminal 50 in the vicinity of the MFP 10 is determined (confirmed), and the processing proceeds to step S23. In step S23, as in the first embodiment, preparation processing of a wireless LAN communication profile, registration processing of the profile, and the like are executed. In step S23 in the third embodiment, the preparation processing of the profile and the like are performed by using various kinds of information acquired via BLE communication in step S4 (the device identification information (e.g., MAC address) of the MFP 10, the wireless LAN communication information (SSID, password, and IP address) of the MFP 10, and the like).

In the next step S24, BLE communication changes over to wireless LAN communication, and, for example, processing (device registration processing) of registering, in the application 120, device information also containing information acquired by using the wireless LAN communication is executed.

According to the above operation, it is possible to obtain an effect similar to the effect of the first embodiment. In particular, in the third embodiment, it is possible to confirm existence of a user of the portable terminal 50 in the vicinity of the MFP 10 by using an IC card or the like instead of a two-dimensional barcode. Specifically, existence of a user in the vicinity of the MFP 10 is confirmed on condition that card identification information acquired in step S41 and card identification information registered in the portable terminal 50 in advance (before step S1) are matched. Then, on condition that existence of the user in the vicinity of the MFP 10 is confirmed, the registration processing (profile registration processing or the like) of registering communication information (SSID, password, and the like) for wireless LAN communication with the MFP 10 in the portable terminal 50 in order to perform the wireless LAN communication is permitted (step S23). Therefore, it is possible to prevent a user (distant user) who does not exist in the vicinity of the MFP 10 from performing the profile registration and the like and to prevent the distant user from accessing the MFP 10.

In this embodiment, each user only needs to register the user's IC card in the user's portable terminal 50 (application 120), and a manager does not need to register all IC cards of all users in the MFP 10. Therefore, it is possible to reduce the burden of the manager.

4. Fourth Embodiment

Figure 19:
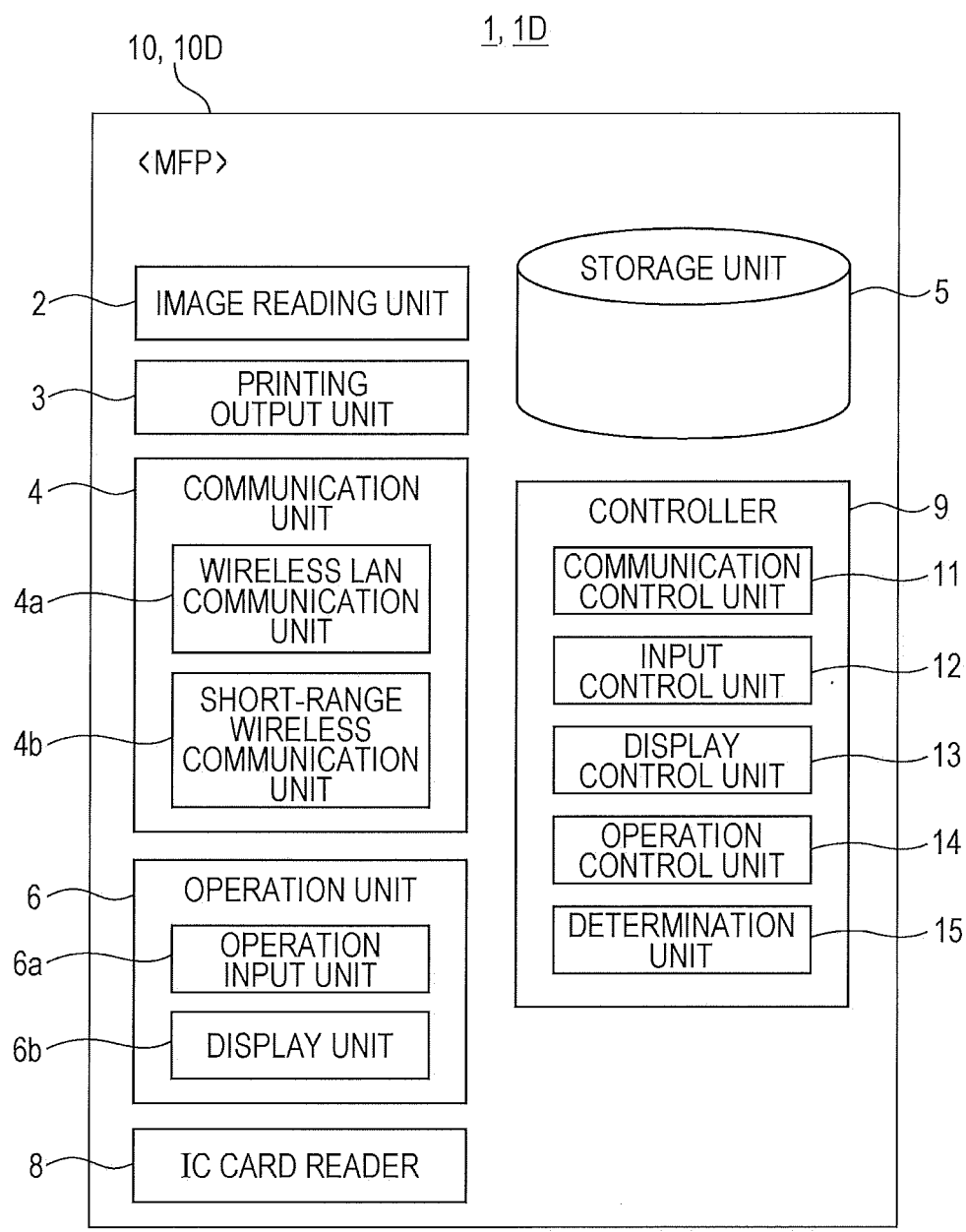
FIG. 19 is a functional block diagram showing a schematic configuration of an MFP according to a fourth embodiment.

The portable terminal 50 (application 120) can communicate with the MFP 10 by using short-range wireless communication to log in the MFP 10 (perform login for operating a panel of the MFP 10). In this fourth embodiment, such a login function (panel login function using the application 120) will be described. Note that a system 1 (1D) in the fourth embodiment has a configuration similar to the configuration of the system 1 (1C) in the third embodiment, and an MFP 10 (10D) and a portable terminal 50 (50D) according to the fourth embodiment have configurations similar to those of the MFP 10 (10C) and the portable terminal 50 (50C) according to the third embodiment. However, as shown in FIG. 19, the MET 10D according to the fourth embodiment also includes a determination unit 15 (described below).

The panel login function using the application 120 (also referred to as "application-use type panel login function") is a function of logging in the MFP 10 while operating the portable terminal 50, instead of logging in the MFP 10 while performing login operation with respect to the operation panel unit 6c (touchscreen 25) of the MFP 10. More specifically, this application-use type panel login function is a function of transmitting authentication information (login information) registered in the application 120 in advance from the portable terminal 50 to the MET 10 via BLE communication to execute authentication processing (login processing). The application-use type panel login function is convenient in that a user does not need to perform input operation of authentication information (login information) to the operation panel unit 6c.

Note that a user who has logged in the MFP by using the application-use type panel login function can use the MFP 10 by using the operation panel unit 6c (touchscreen 25) of the MET 10. Specifically, the login user can use various functions (scanning function, copy function, and the like) of the MFP 10 by operating the operation panel unit 6c. Further, in the application-use type panel login function, only BLE communication is used between the MFP 10 and the portable terminal 50, and wireless LAN communication is not used therebetween.

The application-use type panel login function is originally on the premise that the MFP is used by a user who exists in the vicinity of the MFP 10. However, as described above, the communication range of BLE communication is longer than the communication range of NFC communication and reaches, for example, about 30 meters in some cases. Thus, when, in the case where login information can be transmitted from the portable terminal 50 to the MFP 10 via BLE communication, the login information is always transmitted and the authentication processing is executed, login by a login user U1 is allowed even in the case where the login user U1 exists in a place comparatively distant from the MFP 10. In this case, the MFP 10 may misrecognize operation (panel operation) of the MFP 10 by a user U2 (user U2 who exists in the vicinity of the MFP 10) who is different from the login user U1 as operation by the login user U1 and execute processing based on the operation. In short, panel operation by another user U2 may be misrecognized as panel operation by the login user U1.

In view of this, in this embodiment, processing of confirming existence of the user U1 who possesses the portable terminal 50 (user U1 who attempts to perform login) in the vicinity of the MFP 10 is executed. Specifically, as described below, existence of the user U1 in the vicinity of the MFP 10 is confirmed by using operation of bringing an IC card of the user U1 into contact with (causing the IC card to approach to) the MFP 10. According to this, it is possible to prevent login to the MFP 10 using the portable terminal 50 that exists in a comparatively distant place and to prevent operation by the user U2, which is different from operation by the login user U1, from being misrecognized as operation by the login user U1.

Note that, in the fourth embodiment, as well as in the third embodiment, the IC card (in other words, card identification information thereof) is registered in the user's portable terminal 50 (application 120) in advance (before step S1) by the user U1. The login information (user ID, password, and the like) of the user U1 is also registered in the portable terminal 50 (application 120) in advance (before step S1) by the user U1. The above registration processing may be accepted by the registration control unit 65 or the like.

Figure 20:
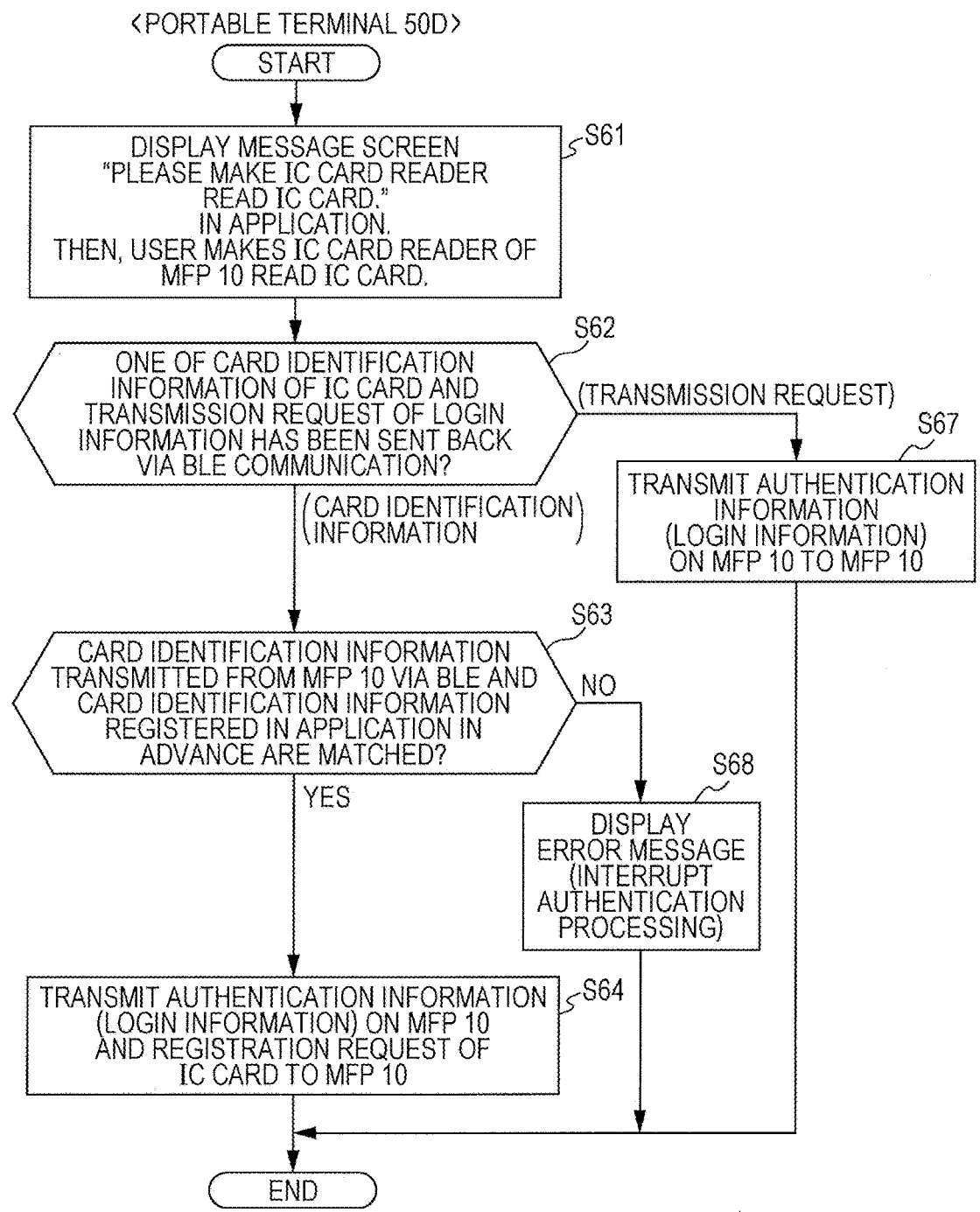
FIG. 20 is a flowchart showing operation of a portable terminal (application) according to the fourth embodiment.
Figure 21:
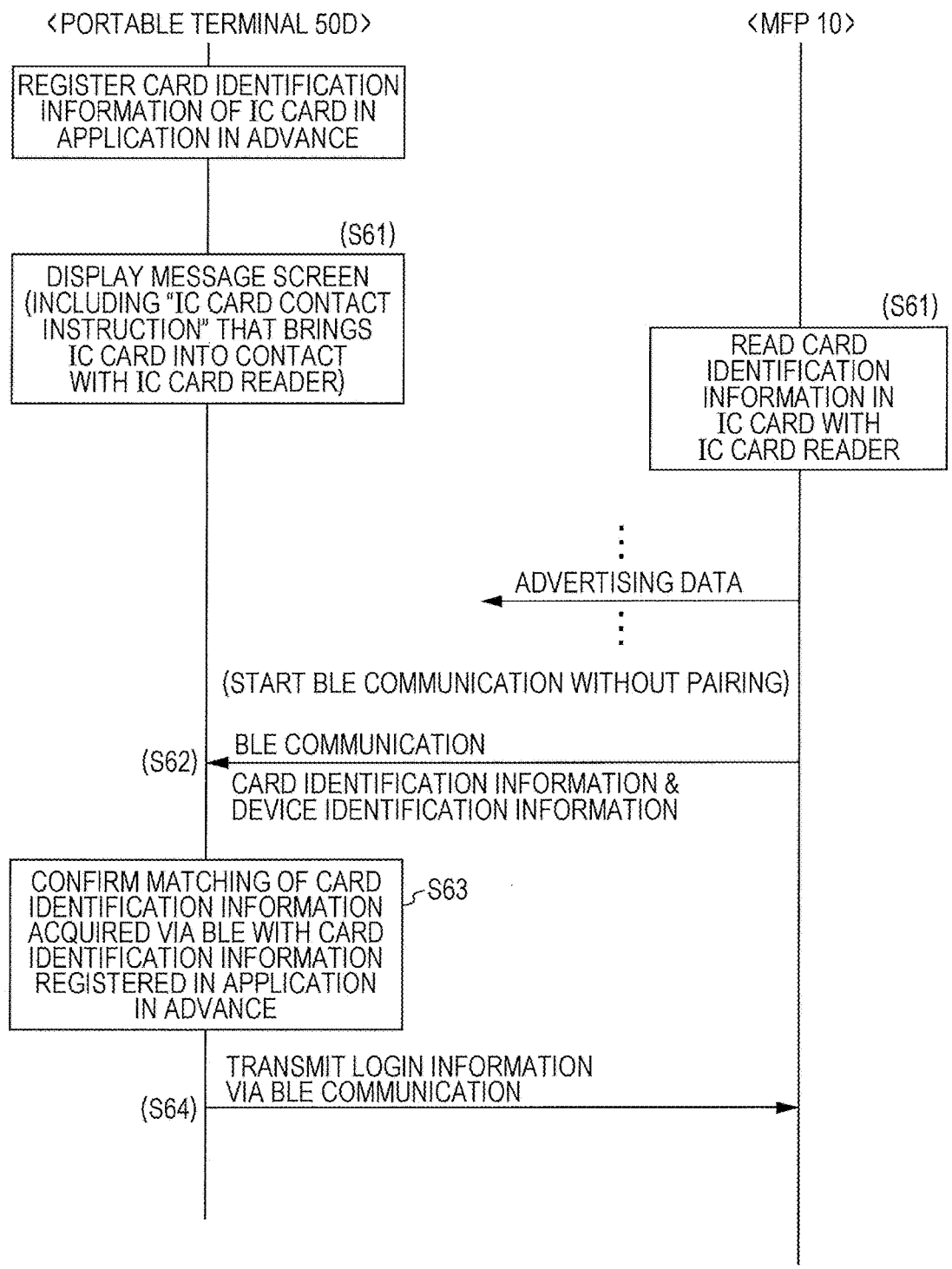
FIG. 21 is a sequence diagram showing operation of each device in a system according to the fourth embodiment.

Hereinafter, operation according to the fourth embodiment will be described in detail below with reference to FIG. 20, FIG. 21, and the like. FIG. 20 is a flowchart showing operation of an application 120 (also referred to as "120D") of the portable terminal 50 (50D) according to the fourth embodiment, and FIG. 21 is a sequence diagram showing operation of each device in the system 1 (1D) according to the fourth embodiment.

First, a user who desires to use the application-use type panel login function starts the application 120 in the portable terminal 50 and pushes the button 212 (option "MFP panel login") in the menu screen 201 (FIG. 6). Note that only a device that has completed the above-mentioned "device registration" is allowed to perform login in the "MFP panel login" function.

When the "MFP panel login" is pushed (selected), the portable terminal 50 first specifies a device to be logged in (login target device). In the case where device registration regarding only a single MFP 10 has already been performed, the MFP 10 is specified as the device to be logged in. Meanwhile, in the case where device registration regarding a plurality of MFPs 10 has already been performed, the portable terminal 50 displays, on the touchscreen 75, a screen (not shown) for selecting a desired MFP 10 from the plurality of MFPs 10 and specifies the login target device in response to selection operation by the user. Specifically, a device selected by the user (selected device) is specified as the login target device.

Figure 22:
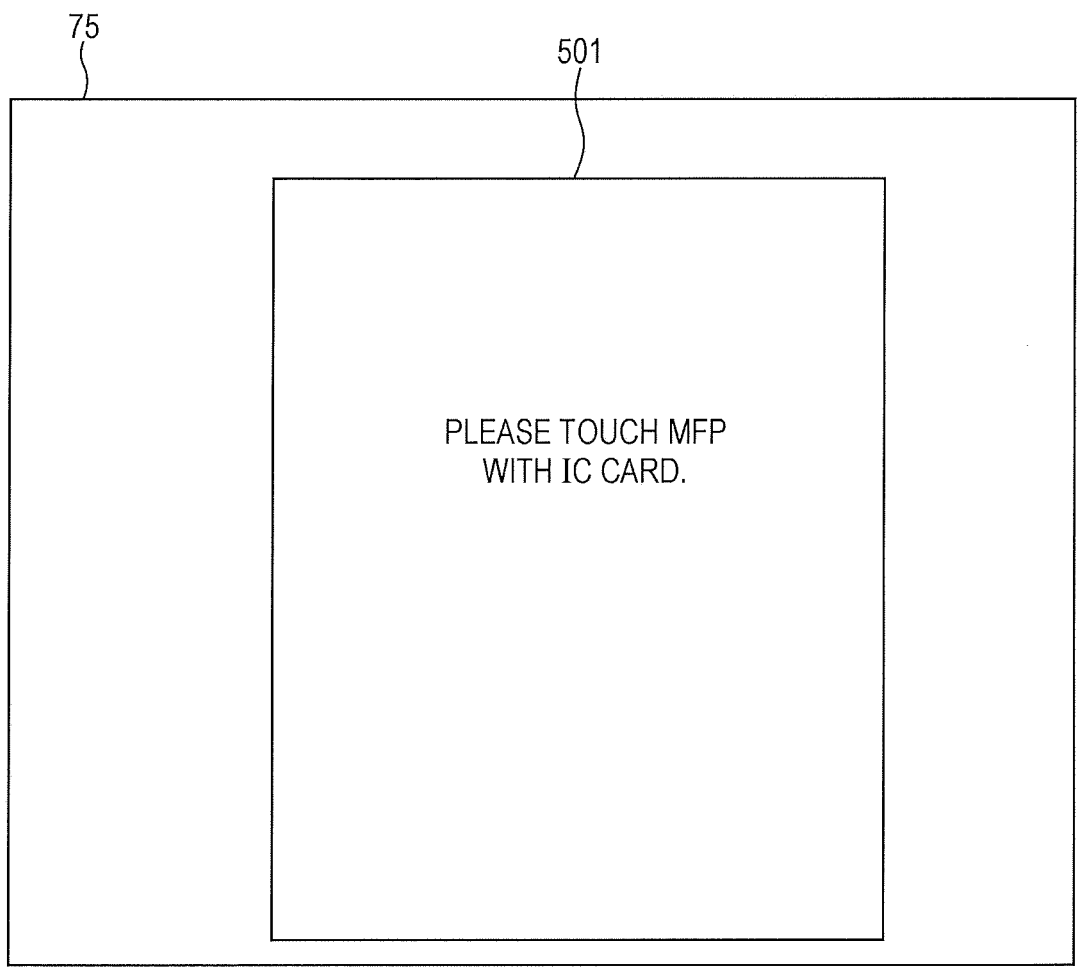
FIG. 22 shows a dialog screen.

When the login target device is specified, the portable terminal 50 displays a dialog screen 501 (FIG. 22) on the touchscreen 75. In the dialog screen 501, the wording "Please touch the MFP with the IC card." is written.

Next, in a state in which the user is close to the MFP 10, the user brings the user's IC card into contact with (causes the user's IC card to approach to) a touch position of the MFP 10 (disposition place of the IC card reader 8) while referring to a display content of the dialog screen 501 (step S61 (see FIG. 20 and FIG. 21)).

The MFP 10 reads card identification information (card number) in the IC card by using the IC card reader 8. Then, the MFP 10 (specifically, determination unit 15) determines whether or not the card identification information has already been registered in the MFP 10. Note that the determination unit 15 is a processing unit for, in the case where operation to log in the MFP 10 is performed by the user, determining whether or not the card identification information read by the IC card reader 8 has already been registered in the MFP 10.

Note that "registration of card identification information in the MFP 10" and "registration of card identification information in the portable terminal 50" are different concepts. Even in the case where card identification information has already been registered in the portable terminal 50 (information registered in the portable terminal 50), the card identification information has not necessarily been registered in the MFP 10. Registration in the MFP 10 is performed in, for example, step S64 (described below).

In the case where it is determined that the card identification information read by using the IC card reader 8 has already been registered in the MFP 10, the MFP 10 determines that the IC card is a card that has already been registered in the MFP 10 and immediately determines existence of the user who possesses the IC card in the vicinity of the MFP 10. Then, the MFP 10 immediately transmits its own device identification information (e.g., MAC address) and a transmission request of login information to the portable terminal 50 via BLE communication.

When the portable terminal 50 receives the device identification information, the portable terminal 50 collates a registered MAC address (device identification information) of the selected device with the MAC address received via BLE communication to confirm that the MFP 10 is the communication target device desired by the user. Further, when the portable terminal 50 receives the transmission request, the portable terminal 50 determines that the MFP 10 has determined that the IC card is a legitimate card and the user who possesses the IC card exists in the vicinity of the MFP 10, and the processing proceeds to from step S62 to step S67 (FIG. 20).

In step S67, in response to the transmission request, the portable terminal 50 transmits the login information (authentication information) registered in the application 120 in advance to the MFP 10. By using the login information (user ID for login and password for login) transmitted from the portable terminal 50, the MFP 10 executes authentication processing. When the authentication processing succeeds, the MFP 10 permits the user corresponding to the login information to perform login. That is, panel login is completed. Thereafter, in a period until logout, the user can operate the MFP 10 by using the operation panel unit 6c of the MFP 10.

As described above, in the case where the IC card is a card that has already been registered in the MFP 10 (in the case where the card identification information read by using the IC card reader 8 has already been registered in the MFP 10), collation operation with a registered content in the portable terminal 50 (step S63 (described below)) is not performed. Then, it is determined that existence of the user of the IC card in the vicinity of the MFP 10 has been confirmed, and the processing proceeds to step S67 and, for example, transmission operation of the login information is performed.

On the contrary, in the case where it is determined that the card identification information read by using the IC card reader 8 has not yet been registered in the MFP 10 (the IC card is a card that has not been registered in the MFP 10), the MFP 10 transmits the card identification information to the portable terminal 50 via BLE communication. When the portable terminal 50 receives the card identification information (ID information of the IC card) from the MFP 10 via BLE communication (step S62), the portable terminal 50 determines that a collation request regarding the card identification information has been received, and the processing proceeds to step S63.

As described above, in the case where, when the user desires to log in the MET 10 (when the user performs login operation), an IC card that has not yet been registered in the MFP 10 (card identification information that has not yet been registered) is read by the IC card reader 8 of the MFP 10, the card identification information that has not yet been registered is transmitted from the MFP 10 to the portable terminal 50 via BLE communication (step S62). Note that, in step S62, the portable terminal 50 also receives device identification information (e.g., MAC address) of the MET 10 from the MFP 10. Then, the processing proceeds to step S63.

In step S63, when the portable terminal 50 first receives the device identification information of the MFP 10, the portable terminal 50 collates a registered MAC address (device identification information) of the selected device with the MAC address received via BLE communication and confirms that the MFP 10 is the communication target device desired by the user.

Further, in step S63, the portable terminal 50 (application 120) collates the card identification information received from the MFP 10 in step S62 with the card identification number of the IC card registered in the application 120 in advance. In short, pieces of the information acquired via two different paths are compared.

In the case where it is determined that both the card identification numbers are not identical (are not matched), transmission of the login information is not permitted (eventually, login is also not permitted), and an error message is displayed (step S68).

On the contrary, in the case where it is determined that both the card identification numbers are identical (are matched) (in the case where collation of the card identification numbers succeeds), the portable terminal 50 (application 120) determines that the IC card is a legitimate card and determines that the user who possesses the IC card exists in the vicinity of the MFP 10, and the processing proceeds to step S64.

In step S64, the portable terminal 50 permits the own terminal to transmit the login information by the user of the portable terminal 50 (user of the IC card). Then, in response to the permission, the portable terminal 50 transmits the login information registered in the application 120 in advance to the MFP 10. By using the login information transmitted from the portable terminal 50, the MFP 10 executes authentication processing. When the authentication processing succeeds, the MFP 10 permits the user corresponding to the login information to perform login. That is, panel login is completed. Thereafter, in a period until logout, the user can operate the MFP 10 by using the operation panel unit 6c of the MFP 10.

In step S64, the portable terminal 50 also transmits a registration request of the IC card (specifically, card identification number thereof). Based on the registration request, the MFP 10 registers the IC card (specifically, card identification number thereof) in the MFP 10.

According to the above operation, login information is not unconditionally (immediately) transmitted from the portable terminal 50 to the MFP 10 on the basis of a login instruction in the application 120, but existence of the user of the portable terminal 50 in the vicinity of the MFP 10 is confirmed first by using the IC card. Specifically, in the case where the operation to log in the MFP 10 is performed by the user, the card identification information of the IC card read by the IC card reader 8 is transmitted from the MFP 10 to the portable terminal 50 via BLE communication. On condition that the card identification information received from the MFP 10 via BLE communication and the card identification information registered in the portable terminal 50 in advance are matched, the portable terminal 50 determines existence of the user in the vicinity of the MFP 10 (step S63). Then, on condition that existence of the user in the vicinity of the MFP 10 is confirmed, the user's login information to the MFP 10 is transmitted to the MFP 10 via BLE communication (step S64).

Therefore, it is possible to prevent the user (distant user) who does not exist in the vicinity of the MFP 10 from performing panel login. In other words, it is possible to prevent login to the MFP 10 using the portable terminal 50 that exists in a comparatively distant place and to prevent operation by the user U2, which is different from operation by the login user U1, from being misrecognized as operation by the login user U1.

In this embodiment, each user only needs to register the user's IC card in the user's portable terminal 50 (application 120), and a manager does not need to register all IC cards of all users in the MFP 10. Therefore, it is possible to reduce the burden of the manager.

5. Others

In the system 1 of each of the above embodiments, it is possible to use the panel login function in the main menu screen 201 (FIG. 6) of the portable terminal 50 as described above.

Although description is omitted in the above description, in the case where device registration is performed via BLE communication, information indicating that "the MFP 10 has the panel login function using BLE communication" is also transmitted from the MFP 10 to the portable terminal 50 in step S4. Then, based on the information, the portable terminal 50 (application 120) registers the information indicating that "the MFP 10 has the panel login function using BLE communication" in the own device 50 (application 120).

In the case where device registration is performed without using BLE communication, the following problem may arise.

For example, when "device registration" (211) is selected in the main menu screen 201 (FIG. 6) of the portable terminal 50 and then a "manual" button 322 is pushed in the next screen 301 (FIG. 7), a "manual registration screen" (not shown) is displayed. The user can manually register wireless LAN communication information (connection information) (IP address, SSID, password, and the like) by using the "manual registration screen".

However, in the case where only registration of wireless LAN communication information is simply performed in such manual registration processing, setting processing is terminated without BLE communication. In this case, BLE communication in step S4 is not performed, and therefore the portable terminal 50 cannot acquire information indicating that "the MFP 10 has the panel login function using BLE communication". As a result, it is difficult for the application 120 to grasp whether or not a communication destination device registered in the "manual registration screen" is a "panel login function usable device" (device that can use the panel login function using BLE communication).

In such a case, for example, when the "MFP panel login" 212 is selected in the main menu screen 201 in FIG. 6, the application 120 cannot immediately recognize existence of the "panel login function usable device" (e.g., MFP 10) even in the case where the device actually exists.

In view of this, in this system 1 (in particular, portable terminal 50), the following registration processing is executed by using a registered device list screen (described below).

Figure 23:
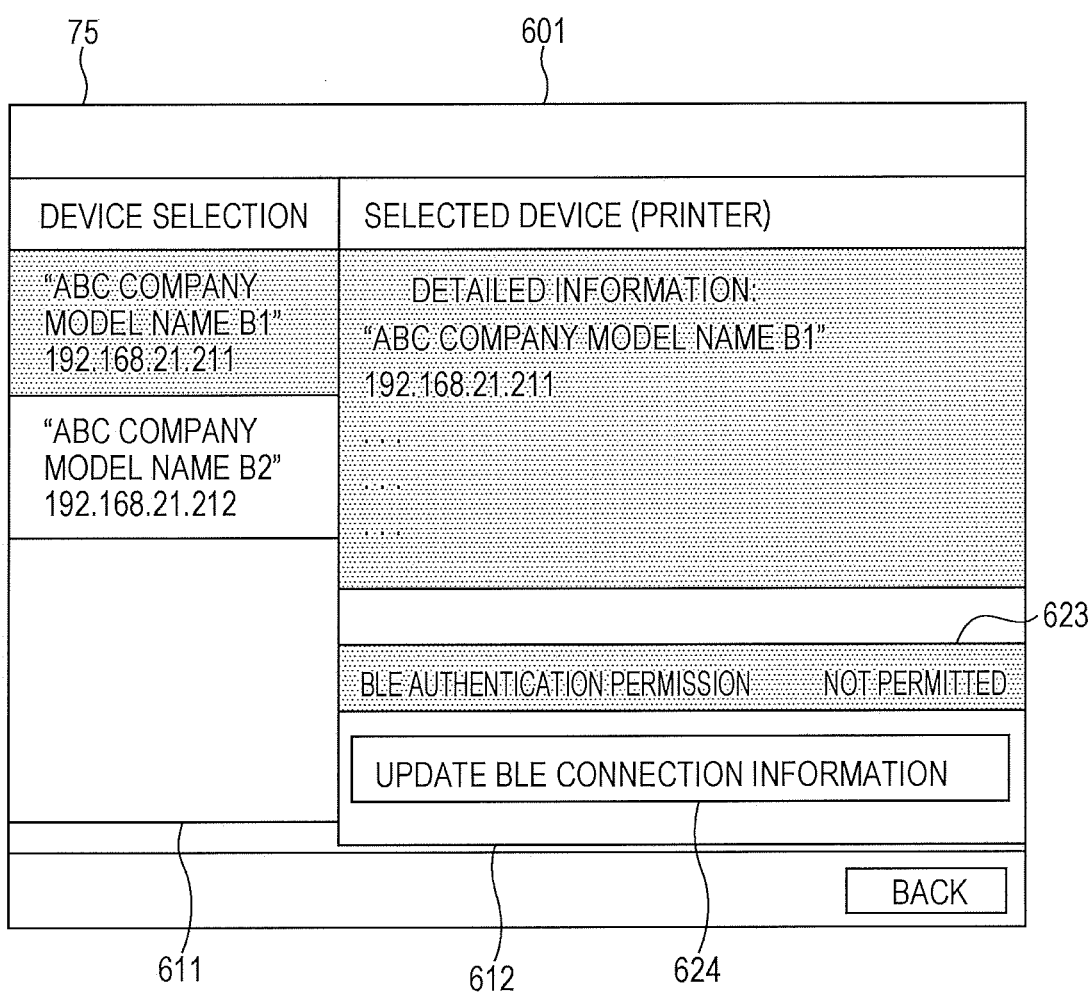
FIG. 23 shows a registered device list screen.

Specifically, for example, when the setting button 215 in the main menu screen 201 (FIG. 6) of the portable terminal 50 is pushed, a submenu screen (not shown) is further displayed. Further, when an option "registered device list" is selected in the submenu screen, a screen (registered device list screen) 601 shown in FIG. 23 is displayed on the touchscreen 75.

The screen 601 has a display section 611 of a registered device on a left side thereof. One or plurality of registered devices (two devices in FIG. 23) is displayed in the display section 611, and a user can select a desired device from the one or plurality of registered devices. Then, detailed information on the selected device is displayed in a display section 612 on the right side in the screen 601.

For example, in the case where a device registered by using BLE communication is selected, information indicating that the selected device is a "device in which BLE authentication is permitted" ("device registered via BLE") ("permitted") is displayed in a setting section 623 (specifically, on the right end side thereof) in the display section 612.

Meanwhile, in the case where a manually registered device is selected, information indicating that the selected device is a "device in which BLE authentication has not yet been permitted" ("device registered not via BLE") ("not permitted") is displayed in the setting section 623 (specifically, on the right end side thereof).

Figure 24:
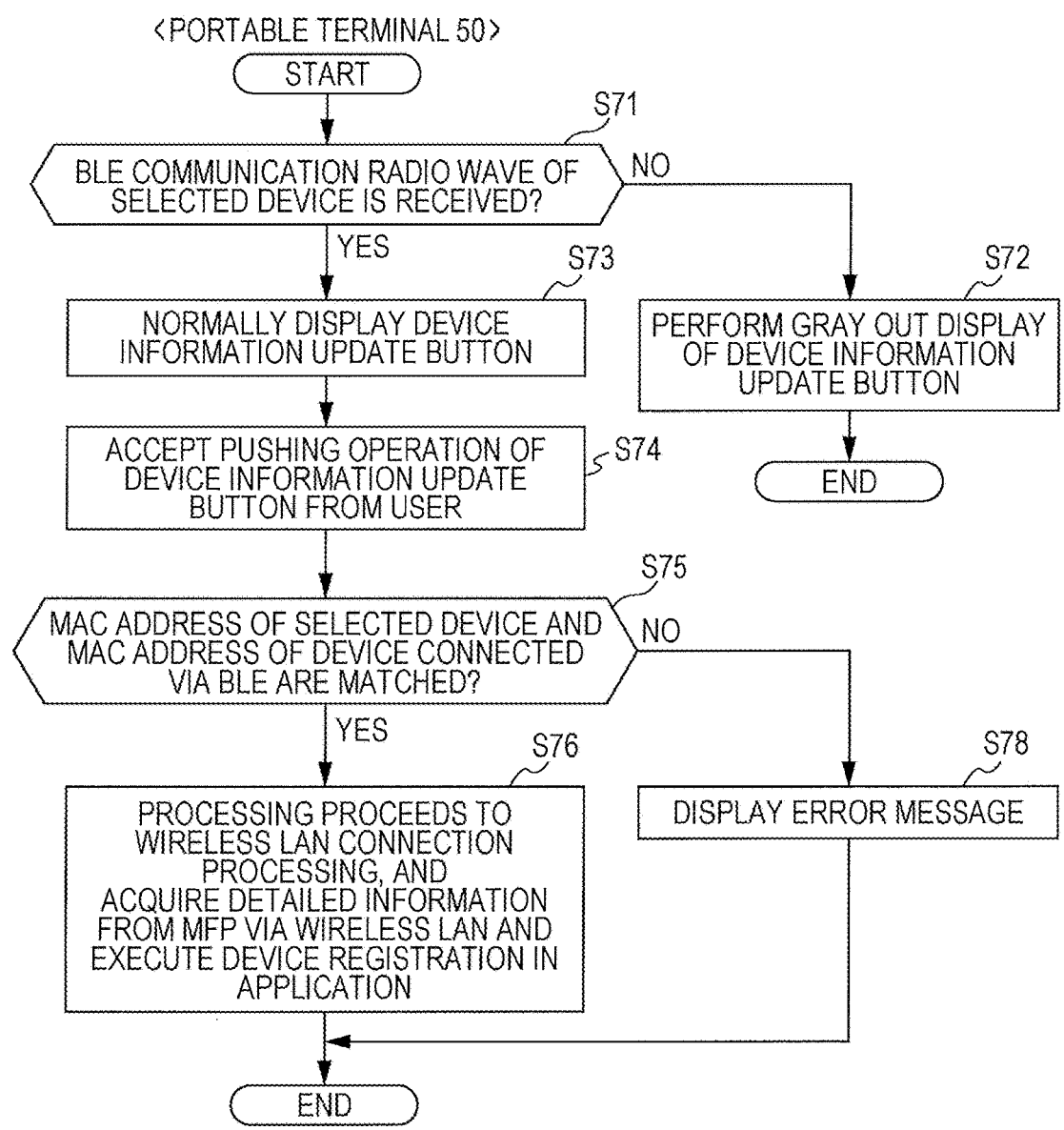
FIG. 24 is a flowchart showing registration processing of BLE-related information.

Thereafter, processing shown in FIG. 24 is executed.

First, in step S71, the portable terminal 50 determines whether or not a BLE communication radio wave (advertising data transmission radio wave) of the device (selected device) selected in the screen 601 is received.

In the case where the advertising data transmission radio wave is not received, the portable terminal 50 performs gray out display of a button 624 in the display section 612 on the right side in the screen 601 (step S72).

On the contrary, in the case where the advertising data transmission radio wave is received, the portable terminal 50 normally displays the button 624 in the display section 612 on the right side in the screen 601. That is, the button 624 is displayed in a state in which pushing operation is acceptable (step S73). Then, the portable terminal 50 accepts pushing operation of the button 624 from the user (step S74).

When the pushing operation of the button 624 is accepted, the processing proceeds to step S75. In step S75, the portable terminal 50 determines whether or not a MAC address of the selected device (MAC address acquired and registered at the time of the previous device registration) and a MAC address of the device connected via BLE communication (step S71) (MAC address received from the BLE-connected device at the present time) are matched.

In the case where both the MAC addresses are not matched, the processing proceeds to step S78. In step S78, the portable terminal 50 displays an error message (e.g., "Devices are not matched. Please execute operation in front of the selected device"). In this case, processing in step S76 is not executed.

On the contrary, in the case where it is confirmed that both the MAC addresses are matched, the processing proceeds to step S76. In step S76, the portable terminal 50 acquires various kinds of information (indicating that "the MFP 10 has the panel login function using BLE communication" and the like) from the MFP 10 via BLE communication. Further, based on the information, the portable terminal 50 registers the information indicating that "the MFP 10 has the panel login function using BLE communication" and the like in the application 120.

Thereafter, in the case where the main menu screen 201 of the application 120 is displayed, the option "MFP panel login" (212) in the main menu screen 201 is validated on the basis of the registered information indicating that the MFP 10 has the "panel login function using BLE communication". By, for example, selecting (pushing) the option 212, the user can execute panel login operation with respect to the near MFP 10 by using the portable terminal 50.

6. Modification Example and the Like

Hereinabove, embodiments of this invention have been described, but this invention is not limited to the content described above.

For example, although an MFP has been exemplified as an image forming device in each embodiment, the image forming device is not limited thereto and may be a single function printer, a single function scanner, or the like.

In the above first to the third embodiments, "acquisition processing" of acquiring communication information for executing wireless LAN communication via BLE communication (see, for example, step S4) and "confirmation processing" of confirming existence of a user who possesses the portable terminal 50 in the vicinity of the MFP 10 (see, for example, steps S22, S32, S42) are executed in this order, but the order is not limited thereto.

For example, contrarily, the acquisition processing (see, for example, step S4) may be executed after the confirmation processing (see, for example, steps S22, S32, and S42) is executed (but before step S23).

In this case, before the confirmation processing (see steps S22, S32, and S42), only part of information transmitted in step S4 in each embodiment may be transmitted as collation information from the MFP 10 to the portable terminal 50 via BLE communication. For example, information (collation information) containing device identification information of the MFP 10 may be transmitted from the MFP 10 to the portable terminal 50 via BLE communication before the confirmation processing. Then, collation processing (see steps S22, S32, and S42) may be performed by using the part of the information (collation information). Before step S5, only an IP address of the MFP 10 may be transmitted (as information for specifying a communication destination in communication in step S5) from the MFP 10 to the portable terminal 50 via BLE communication.

Note that the collation information may contain only, for example, device identification information (MAC address) of the MFP 10 to be communicated. Alternatively, the collation information may contain the device identification information and part of communication information (e.g., only SSID) for executing wireless LAN communication. Remaining pieces of information (e.g., password for wireless LAN) of wireless LAN communication information (or all pieces thereof) is not transmitted from the MFP 10 to the portable terminal 50 before the confirmation processing and may be transmitted from the MFP 10 to the portable terminal 50 after the confirmation processing. When information transmitted from the MFP 10 to the portable terminal 50 before the confirmation processing is terminated is limited, it is possible to improve security.

In each of the above embodiments, BLE communication without pairing processing is exemplified, but BLE communication is not limited thereto. For example, BLE communication may be performed along with pairing processing (specifically, pairing processing using method without user confirmation (e.g., "Just Works" method)).

Although the present invention has been described and illustrated in detail, it is clearly understood that the same is by way of illustrated and example only and is not to be taken by way of limitation, the scope of the present invention being interpreted by terms of the appended claims.

What is claimed is:

1. A non-transitory recording medium storing a computer readable program that causes a computer included in a portable terminal to communicate with an image forming device to execute:
   a) a step of acquiring communication information from the image forming device via first wireless communication using a first wireless communication method, the communication information being information for executing second wireless communication using a second wireless communication method;
   b) a step of executing confirmation processing of confirming existence of a user who possesses the portable terminal in the vicinity of the image forming device; and
   c) a step of, on condition that existence of the user in the vicinity of the image forming device is confirmed in the step b), permitting registration processing of registering the communication information in the portable terminal in order to execute the second wireless communication, the communication information being communication information for the second wireless communication with the image forming device and being acquired in the step a),
   wherein the confirmation processing is executed based on whether information acquired via a first path using the first wireless communication and information acquired via a second path different from the first path using the first wireless communication are matched.

2. The non-transitory recording medium storing a computer readable program according to claim 1, wherein the step b) includes
   b-1) a step of capturing an image of a two-dimensional barcode displayed in the image forming device by using an image pickup unit of the portable terminal, and
   b-2) a step of determining existence of the user in the vicinity of the image forming device on condition that information acquired by analyzing the two-dimensional barcode included in the photographed image captured in the step b-1) and information contained in the communication information acquired in the step a) are matched.

3. The non-transitory recording medium storing a computer readable program according to claim 1, wherein
the step b) includes
b-1) a step of capturing an image of a two-dimensional barcode displayed in the image forming device by using an image pickup unit of the portable terminal,
b-2) a step of acquiring information containing device identification information of the image forming device from the image forming device via the first wireless communication, and
b-3) a step of determining existence of the user in the vicinity of the image forming device on condition that information acquired by analyzing the two-dimensional barcode included in the photographed image captured in the step b-1) and information acquired in the step b-2) are matched.

4. The non-transitory recording medium storing a computer readable program according to claim 1, wherein
the step b) includes
b-1) a step of reading information of an NFC tag placed in the image forming device by using the portable terminal to acquire the information, and
b-2) a step of determining existence of the user in the vicinity of the image forming device on condition that the information acquired in the step b-1) and information contained in the communication information acquired in the step a) are matched.

5. The non-transitory recording medium storing a computer readable program according to claim 1, wherein
the step b) includes
b-1) a step of reading information of an NFC tag placed in the image forming device by using the portable terminal to acquire the information,
b-2) a step of acquiring information containing device identification information of the image forming device from the image forming device in the first wireless communication, and
b-3) a step of determining existence of the user in the vicinity of the image forming device on condition that the information acquired in the step b-1) and information acquired in the step b-2) are matched.

6. The non-transitory recording medium storing a computer readable program according to claim 2, wherein
the communication information contains device identification information, and
in the step b-2), existence of the user in the vicinity of the image forming device is determined on condition that device identification information acquired in the step b-1) and the device identification information acquired in the step a) are matched.

7. The non-transitory recording medium storing a computer readable program according to claim 6, wherein
the device identification information includes a MAC address.

8. The non-transitory recording medium storing a computer readable program according to claim 7, wherein
the communication information includes an SSID for the second wireless communication and a password for the second wireless communication, and
in the step b-2), existence of the user in the vicinity of the image forming device is determined on condition that an SSID, a password, and a MAC address acquired in the step b-1) are matched with the SSID, the password, and the MAC address, respectively, acquired in the step a).

9. The non-transitory recording medium storing a computer readable program according to claim 1, wherein
the step b) includes
b-1) a step of receiving card identification information from the image forming device via the first wireless communication, the card identification information being card identification information of an IC card of the user and being read by an IC card reader of the image forming device, and
b-2) a step of determining existence of the user in the vicinity of the image forming device on condition that the card identification information acquired in the step b-1) and card identification information of a usable IC card registered in the portable terminal in advance are matched.

10. The non-transitory recording medium storing a computer readable program according to claim 1, wherein
the computer readable program causes the computer to further execute
d) a step of trying the second wireless communication with a communication destination specified by an IP address acquired in the step a) and, based on success or failure of the second wireless communication, determining whether or not the registration processing of the communication information for executing the second wireless communication has been completed, and
the step c) is executed on condition that it is determined in the step d) that the registration processing of the communication information for executing the second wireless communication has not yet been completed.

11. The non-transitory recording medium storing a computer readable program according to claim 1, wherein
the first wireless communication is executed without pairing processing between the image forming device and the portable terminal.

12. A portable terminal to communicate with an image forming device, comprising:
a first wireless communication unit configured to execute first wireless communication using a first wireless communication method;
a second wireless communication unit configured to execute second wireless communication using a second wireless communication method; and
a hardware processor configured to:
acquire information containing communication information for executing the second wireless communication from the image forming device via the first wireless communication;
execute confirmation processing of confirming existence of a user who possesses the portable terminal in the vicinity of the image forming device; and
permit registration processing of registering the communication information for the second wireless communication with the image forming device in the portable terminal in order to execute the second wireless communication on condition that the hardware processor confirms existence of the user in the vicinity of the image forming device,
wherein the confirmation processing is executed based on whether information acquired via a first path using the first wireless communication and information acquired via a second path different from the first path using the first wireless communication are matched.

13. The portable terminal according to claim 12, further comprising:
an image pickup unit configured to capture an image of a two-dimensional barcode displayed in the image forming device, wherein the hardware processor is configured to determine existence of the user in the vicinity of the image forming device on condition that information acquired by analyzing the two-dimensional barcode included in the photographed image captured by the image pickup unit and the information acquired from the image forming device via the first wireless communication are matched.

14. The portable terminal according to claim 13, wherein the hardware processor is configured to:
   acquire information containing device identification information of the image forming device from the image forming device via the first wireless communication, and
   determine existence of the user in the vicinity of the image forming device on condition that device identification information acquired by analyzing the two-dimensional barcode in the photographed image and the device identification information acquired from the image forming device via the first wireless communication are matched.

15. The portable terminal according to claim 14, wherein the communication information includes an SSID for the second wireless communication and a password for the second wireless communication, and
   the hardware processor determines existence of the user in the vicinity of the image forming device on condition that an SSID, a password, and a MAC address acquired by analyzing the two-dimensional barcode in the photographed image are matched with the SSID, the password, and a MAC address, respectively, acquired from the image forming device via the first wireless communication.

16. The portable terminal according to claim 12, further comprising:
   a reading unit configured to read information of an NFC tag placed in the image forming device to acquire the information, wherein
   the hardware processor is configured to determine existence of the user in the vicinity of the image forming device on condition that the information acquired by the reading unit and the information acquired from the image forming device via the first wireless communication are matched.

17. The portable terminal according to claim 16, wherein the hardware processor is configured to:
   acquire information containing device identification information of the image forming device from the image forming device via the first wireless communication, and
   determine existence of the user in the vicinity of the image forming device on condition that device identification information acquired by the reading unit and the device identification information acquired from the image forming device via the first wireless communication are matched.

18. The portable terminal according to claim 17, wherein the communication information includes an SSID for the second wireless communication and a password for the second wireless communication, and
   the hardware processor determines existence of the user in the vicinity of the image forming device on condition that an SSID, a password, and a MAC address acquired by the reading unit are matched with the SSID, the password, and a MAC address, respectively, acquired from the image forming device via the first wireless communication.

19. The portable terminal according to claim 12, wherein the first wireless communication unit receives card identification information from the image forming device, the card identification information being card identification information of an IC card of the user and being read by an IC card reader of the image forming device, and
   the hardware processor is configured to determine existence of the user in the vicinity of the image forming device on condition that the card identification information acquired by the first wireless communication unit via the first wireless communication and card identification information of a usable IC card registered in the portable terminal in advance are matched.

20. The portable terminal according to claim 12, wherein the hardware processor is configured to:
   try the second wireless communication with a communication destination specified by an IP address acquired via the first wireless communication, and
   determine whether or not the registration processing of the communication information for executing the second wireless communication has been completed on the basis of a result of trial of the second wireless communication, execute the confirmation processing on condition that it is determined that the registration processing has not yet been completed, and determine whether to permit the registration processing of registering the communication information in the portable terminal in order to execute the second wireless communication.

21. The portable terminal according to claim 12, wherein the first wireless communication is executed without pairing processing between the image forming device and the portable terminal.

* * * * *